United States Patent [19]

Butterfield et al.

[11] Patent Number: 5,917,852
[45] Date of Patent: Jun. 29, 1999

[54] DATA SCRAMBLING SYSTEM AND METHOD AND COMMUNICATIONS SYSTEM INCORPORATING SAME

[75] Inventors: Lee A Butterfield, W. Jordan; Thomas R Giallorenzi, Herriman; L Andrew Gibson, Jr., Riverton; Dan M Griffin, Bountiful; Johnny M Harris, Centerville; Steven B Perkins, Sandy; R William Steagall, North Salt Lake, all of Utah

[73] Assignee: L-3 Communications Corporation, New York, N.Y.

[21] Appl. No.: 08/873,538

[22] Filed: Jun. 11, 1997

[51] Int. Cl.⁶ .............................. H04B 15/00; H04K 1/00; H04L 27/30
[52] U.S. Cl. ................................ 375/200; 380/9; 380/43
[58] Field of Search ...................... 375/200, 206, 375/207, 208, 261, 285, 254, 377; 380/6, 9, 21, 43, 44, 46; 370/310, 320, 335, 342

[56] References Cited

U.S. PATENT DOCUMENTS

| | | | |
|---|---|---|---|
| 5,077,753 | 12/1991 | Grau, Jr. et al. | 375/200 |
| 5,103,459 | 4/1992 | Gilhousen et al. | 375/1 |
| 5,325,394 | 6/1994 | Bruckert | 375/200 |
| 5,499,236 | 3/1996 | Giallorenzi et al. | 370/18 |
| 5,550,809 | 8/1996 | Bottomley et al. | 370/18 |
| 5,583,853 | 12/1996 | Giallorenzi et al. | 370/441 |
| 5,583,915 | 12/1996 | Ishida | 379/58 |
| 5,668,813 | 9/1997 | Malek et al. | 370/514 |
| 5,675,344 | 10/1997 | Tong et al. | 342/457 |
| 5,712,866 | 1/1998 | Stein et al. | 375/200 |
| 5,727,028 | 3/1998 | Ghosh et al. | 375/340 |
| 5,734,647 | 3/1998 | Yoshida et al. | 370/335 |
| 5,793,759 | 8/1998 | Rakib et al. | 370/342 |

*Primary Examiner*—Huy D. Vu
*Assistant Examiner*—Jean B Corrielus
*Attorney, Agent, or Firm*—Perman & Green, LLP

[57] ABSTRACT

Users or subscribers of a multi-user communications system, such as a spread spectrum communications system, provide signals to the central station or base unit of that system, and receive signals therefrom. Avoidance of interference among those users' signals is needed to ensure proper operation of the system. To do so, the data of each user is individually scrambled to randomize the data that different users are transmitting, in order to improve tracking performance at a receiver. The data of each user is scrambled independently, in a manner unique to that user in the system, in order to improve tracking performance and detection performance of a receiver. This scrambling makes the multi-user interference zero mean, and makes it possible to integrate out or average out the multi-user interference. The pattern or sequence used for this scrambling, and the pattern or sequence used for spreading here, are preferably identical except in frequency.

26 Claims, 8 Drawing Sheets

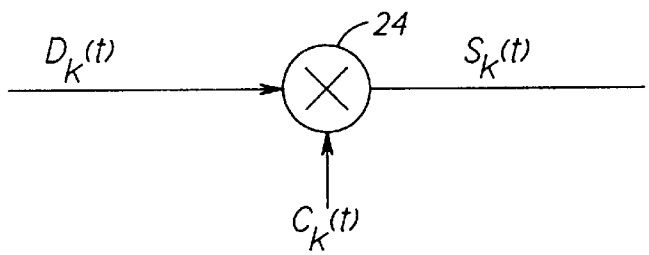
FIG. 3
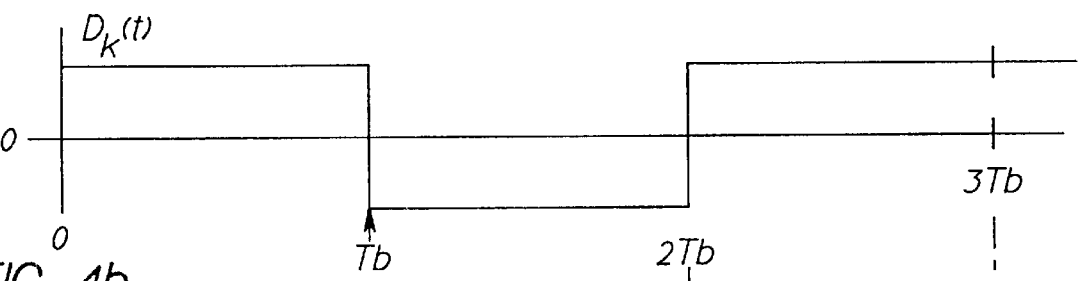
FIG. 4a
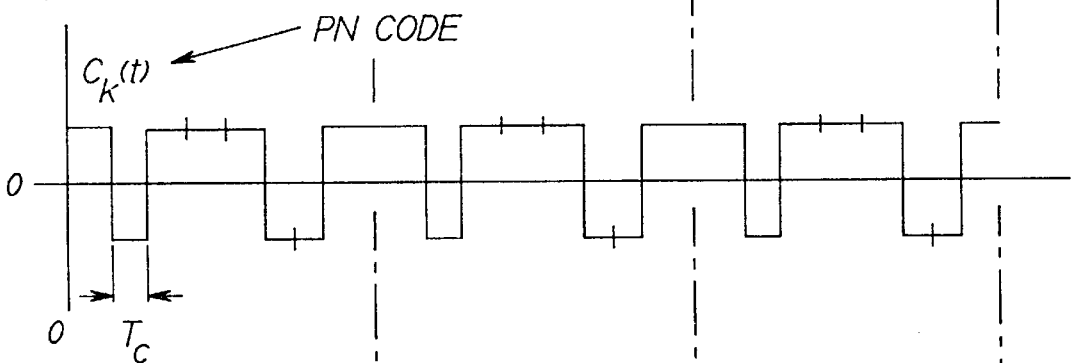
FIG. 4b
$$PG = \frac{T_b}{T_c} = 8$$
FIG. 4c
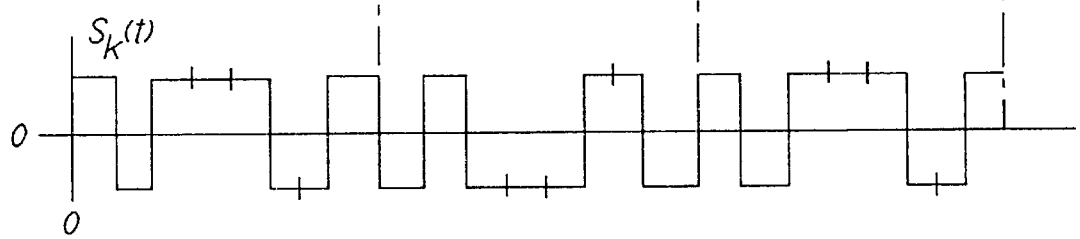

$P_K(t)$ IS SAME AS $C_K(t)$ AT A DIFFERENT RATE

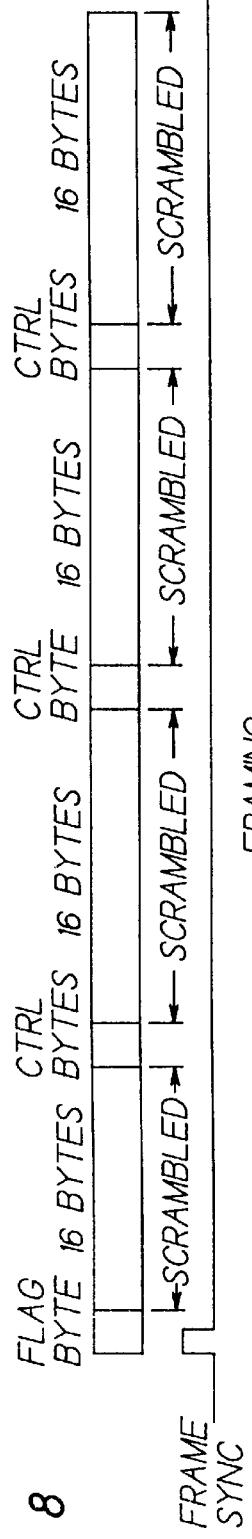
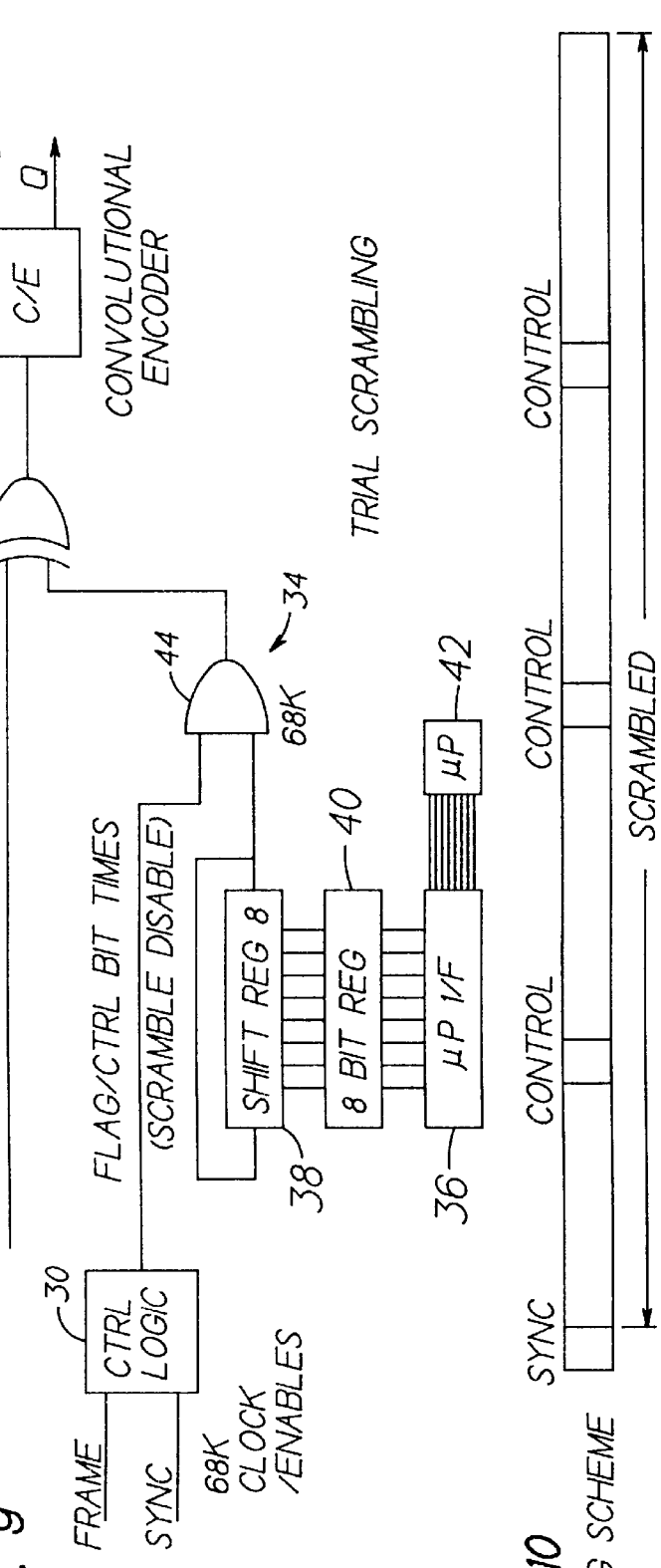
FIG. 8 FRAMING SCHEME
FIG. 9 TRIAL SCRAMBLING
FIG. 10 FRAMING SCHEME

DATA SCRAMBLING SYSTEM AND METHOD AND COMMUNICATIONS SYSTEM INCORPORATING SAME

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

FIELD OF THE INVENTION

The present invention relates to telecommunications, and more particularly to telecommunications among a plurality of transmitter(s) and receiver(s). The present invention also relates to multiplex communications, and more particularly to channel assignment techniques for combining or distributing information via code word channels using multiple access techniques such as code division multiple access. The present invention further relates to communications such as pulse or digital communications, and more particularly to spread spectrum communications using plural paths or channels, such as direct sequence spread spectrum communications. The present invention still further relates to code division, multiple access (CDMA) communications systems, and more particularly to direct-sequence (DS) synchronous CDMA communications systems.

BACKGROUND OF THE INVENTION

In a code division, multiple access (CDMA) communications system, a plurality of user communication signals can be transmitted within and thus share the same portion of the frequency spectrum. This is accomplished by providing a plurality of different pseudonoise (PN) binary code sequences (e.g., one for each user) that modulate a carrier, thereby "spreading" the spectrum of the resulting waveform. In a given receiver, all of the user signals are received, and one is selected by applying an assigned one of the PN binary code sequences to a correlator to extract only the signal energy intended for the receiver, thereby "despreading" the received CDMA transmission. All other (uncorrelated) user transmissions appear as noise.

In digital spread spectrum communications, data signals, such as voice signals, are digitized (turned into ones and zeros, or the like) and then a pseudonoise (PN) code (also referred to as a signature sequence) is impressed upon the digitized data. A pseudonoise code is usually a high frequency noise-like waveform that is multiplied with the digitized data before it is transmitted; this has the effect of spreading out the spectrum of the signal, hence the term spread spectrum communications. The spread digitized signal is then transmitted to a receiver, at which the same or a corresponding pseudonoise binary code sequence is applied to the received signal to despread it and extract the digitized signal. The digitized signal can then be digital-to-analog converted to obtain the original voice or other data signal. In a multi-user system, if each user in the system uses a different or distinct pseudonoise or signature sequence code, then at the other end of the link, if that particular noise-like waveform or signature sequence is applied to the received signal, the data can then be extracted from that one user's signal, and any other user that is using a different noise-like or pseudonoise sequence will look just like background noise.

There are a number of approaches to accomplish such multi-user channelization. In one such approach, frequency division multiple access (FDMA), each user's transmitter has a distinct band of frequency, and the users do not overlap in frequency. The users can thus be distinguished by tuning to the appropriate frequency band. In time division multiple access (TDMA), every user's transmitter gets a specified time slot; all users then share and utilize the entire bandwidth of the selected channel, but each user transmits for only a short period of time and then turns off to let another user turn on. Thus, in TDMA, there is a series of users that take turns one at a time in a round robin fashion sharing the channel. In code division multiple access (CDMA), all of the users transmit all of the time, and can use the entire frequency band, so that the users can overlap both in frequency and in time in the resulting aggregate signal. In CDMA, the different users are identified or distinguished using pseudonoise codes or signature sequences. Every user is given a distinct pseudonoise code or signature sequence. The aggregate signal is the sum of all of the transmitted signals from all of the users with all of the distinct codes and distinct data. As long as the receiver knows the PN code of the user whose signal he is trying to extract from the aggregate signal that he receives, that receiver can then pull out the signal that it is interested in by knowing the PN code and using that PN code to accomplish despreading. At the modulator for each CDMA user, the signal to be transmitted is spread using the PN code, and then at the demodulator that signal is despread by multiplying the aggregate signal by the same PN code that was used at the transmitter.

Because the subscriber units in an asynchronous CDMA system do not try to coordinate their transmissions, but transmit whenever they want to, the base station will have to align itself with a distinct alignment for each active user's signal. Thus, when the base station is trying to despread each user's signal individually, it will have a different timing offset for every user. On the other hand, in a synchronous CDMA system, signals in the reverse channel (from subscriber unit to base station) are required to arrive with a particular phase alignment. Synchronous CDMA systems are further described in U.S. Pat. No. 5,499,236 issued Mar. 12, 1996 for "Synchronous Multipoint-to-Point CDMA Communication System" by Thomas R. Giallorenzi et al., and in its division U.S. Pat. No. 5,583,853 issued Dec. 10, 1996 for "Synchronous CDMA Transmitter/Receiver" by Thomas R. Giallorenzi et al., each of which is hereby incorporated by reference herein.

A receiver in a code division multiple access (CDMA) communications system having multiple users receives the aggregate signal produced by those users. This aggregate signal is a parallel transmission of a large amount of data from a plurality of users. Signals to and from any particular user are spread with a particular spreading sequence or a pseudonoise (PN) code or signature sequence that are impressed upon the data waveform. The terms spreading sequence, pseudonoise code and signature sequence as used here are intended to be inclusive and synonymous. The pseudonoise code so used is unique for each user in the system. Once each user has its PN code impressed upon its data, the signals from all users are summed together electromagnetically in the atmosphere when they are transmitted from different points in a multipoint-to-point type system. In the case of a point-to-multipoint system, the signals from the users are summed together electronically or digitally in a baseband, such as in the base station of that system, before being transmitted out to the multipoints or subscriber units such as in the cell of a cellular communications system. However, the signals of some multiple users that are so summed together can sometimes each transmit the same or very similar data or repetitive patterns. Thus, notwithstanding use of different spreading codes for the different users, difficulty will be encountered in avoiding interference between those signals. The present invention addresses this problem.

For a point-to-multipoint synchronous CDMA system, the tracking loop at the base station receiver tries to average over multiple data bits in order to average out noise and establish the time of arrival of the signal of choice, reject the other signals and treating them like noise and try to pull the desired signal out from among all of the others in the aggregate signal and track that desired signal. Separating out the desired signal is accomplished by despreading the aggregate received signal. In despreading, the aggregate signal is remultiplied by the spreading code for a particular desired user. Depreading extracts the data from that one channel while rejecting the data from the other channels. Ideally, the other channels would be using PN codes which are orthogonal to the desired user's code, which is being used for despreading. Thus, when the aggregate received signal is multiplied by the PN code of the desired user, and is then integrated over a bit, the signal is despread. Ideally, signals of all of the other users in the system will map to zero when this despreading process is performed. In other words, if the signal of an interfering user is despread using the PN code of the desired user, then in an ideal orthogonal CDMA type environment, the output of the integrator would be zero. In other words, despreading would remove the signal of the undesired user from the received aggregate signal. If the signal of the desired user is present in the aggregate received signal, then that user's data would not be removed by despreading. However, in a real CDMA system, a number of impairments are present which prevent true orthogonality between all of the different spreading codes of the different users, so that there is some small correlation between the different users that would not be removed by despreading. This additional non-zero signal at the output would be spillover from the other channels into the channel for the desired user; this spillover is called multi-user interference, also referred to as multiple access interference or cross-channel interference. This multi-user interference degrades the desired signal produced by despreading. This multi-user interference has certain properties. If the data that the interfering users are sending is random relative to the data transmitted by the desired user, then the multi-user interference has a zero mean. For this reason, if the received despread signal is averaged over a long enough period of time, the multi-user interference will average to zero. Thus, a zero mean for multi-user interference is a desirable feature. However, in the case of correlated data, which is where for some reason multiple users are sending the same data pattern, then the noise from multi-user interference does not have a zero mean. For that it situation, integrating the despread signal does not remove the multi-user interference, but instead will create a skew of the received signal. Typically, there may be additional background noise added to the desired signal. Although this background noise is generally present, the background noise can be removed by integration because its mean should be zero. A data detection function or tracking function will have substantially improved performance if data being transmitted by all users is random with respect to each other. However, in some application such as a fixed wireless loop communications system, there are times where there may be a tendency for the data from several users to be the same. For example, if several users of a telephone system happen to stop speaking at the same time, then the resulting silence pattern transmitted from those users' respective telephones may look the same across users. If this occurs with a large number of users, then tracking performance can be substantially degraded and undesired jitter could then be present.

SUMMARY OF THE INVENTION

Accordingly, an object of the present invention is to provide apparatus and method for reducing multi-user interference.

Another object of the present invention is to provide apparatus and method for reducing jitter in the tracking of a desired signal among a plurality of interfering signals even when the desired signal and the interfering signals contain the same or correlatable data.

Briefly, these and other objects of the present invention are accomplished by individually scrambling the data of each user of a multi-user communications system to randomize the data that different users are transmitting, in order to improve tracking performance at a receiver. The data of each user is scrambled independently, in order to improve tracking performance and detection performance of a receiver. This scrambling makes the multi-user interference zero mean and makes it possible to integrate out or average out the multi-user interference.

Other objects, advantages and novel features of the invention will become apparent from the following detailed description of the invention when considered in conjunction with the accompanying drawings.

BRIEF DESCRIPTION OF THE DRAWINGS

In the drawings,

FIG. 3 is a diagrammatic representation of spreading system;

FIGS. 4a–4c are a waveform timing diagrams respectively showing illustrative timing for four consecutive illustrative bits of an unspread signal, a pseudonoise code and a resulting spread signal for the system of FIG. 3;

FIG. 8 shows one embodiment of framing of a scrambled signal according to the present invention;

FIG. 9 is a block diagram of a system that can produce the scrambled signal of FIG. 8;

FIG. 10 is another embodiment of framing of a scrambled signal according to the present invention;

DETAILED DESCRIPTION

Figure 1:
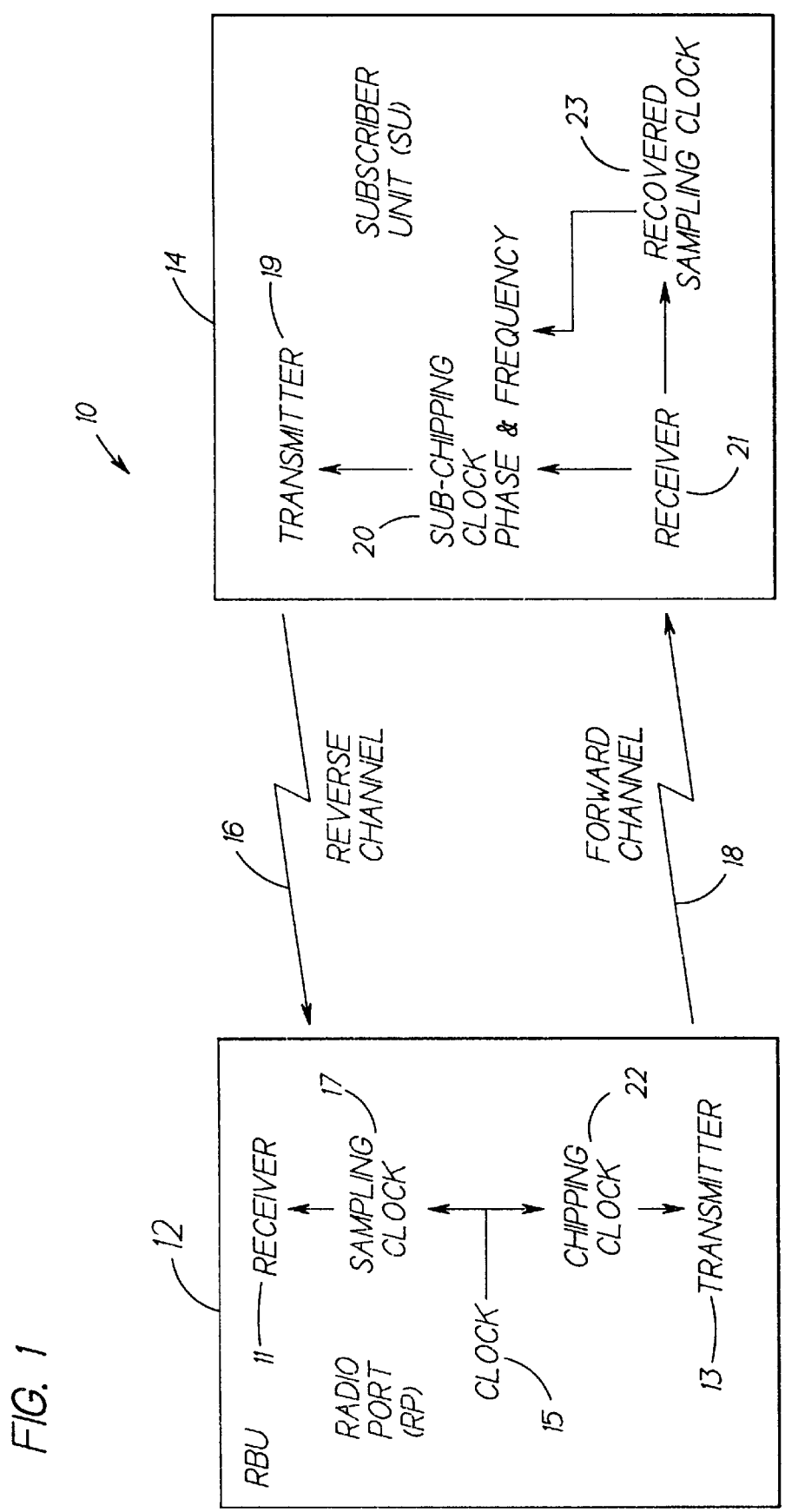
FIG. 1 is a block diagram of a communications system.

Referring now to the drawings, wherein like reference characters designate like or corresponding parts throughout the several views, there is shown in FIG. 1 a simplified block diagram of a synchronous CDMA fixed wireless loop (FWL) single telephone connection, emphasizing the timing clocks of modems at each end of that connection. FIG. 1 is for a CDMA fixed wireless loop system, however, the present invention can be used with other systems other than FWL systems, although synchronous CDMA is particualrly preferred. System 10 of FIG. 1 includes radio base unit (RBU) 12, also referred to as a radio port (RP), and subscriber unit (SU) or user 14, linked by reverse channel 16 and forward channel 18. A local loop provides the service connection between a telephone subscriber in a local geographic area, and the central office, for that area, of a telephone system. Beyond the local loop, from the central office out, is part of the public switched telephone network which is where all of the telephone signals are combined and are transmitted together from place to place (e.g., from city to city). In a wireless local loop system, the telephone lines that would otherwise provide the connection to and from a home, business or other subscriber, are replaced by a wireless system. RBU 12 includes receiver 11, transmitter 13, clock 15, sampling clock 17 and chipping clock 22. Clock 15 is used to generate sampling clock 17 and chipping clock 22. Sampling clock 17 clocks RBU receiver 11. Chipping clock 22 clocks RBU transmitter 13. Subscriber unit 14 includes transmitter 19, receiver 21, recovered sampling clock 23 and sub-chipping clock 20. Clock 20 is used to clock SU transmitter 19. Phase of clock 20 is controlled by SU receiver 21. Frequency of clock 20 is controlled by clock 23, which recovers the RBU chipping clock 22 signal from SU receiver 21. RBU transmitter 13 transmits to SU receiver 21 on forward channel 18. SU transmitter 19 transmits to RBU receiver 11 on reverse channel 16. Although only one subscriber unit 14 is shown in FIG. 1, it should be understood that a single RBU can handle a plurality of subscriber units. Timing coherence for all users is needed in order to maximize the number of users in system 10. That means that in order to ensure low cross correlation between multiple subscriber units, all subscriber units' PN epochs must occur at nearly the same instant in time at the RBU. For this to happen, one must force each subscriber unit's transmitter chipping clock 20 to be coherent (phase locked) with the RBU's chipping clock 22. Additionally, there are delay variations that occur between subscriber unit 14 and RBU 12 that must be taken into consideration. Timing jitter for system 10 is important. Timing error estimates made at the RBU's receiver 11 are used to adjust the subscriber unit's PN clock phase.

Figure 2:
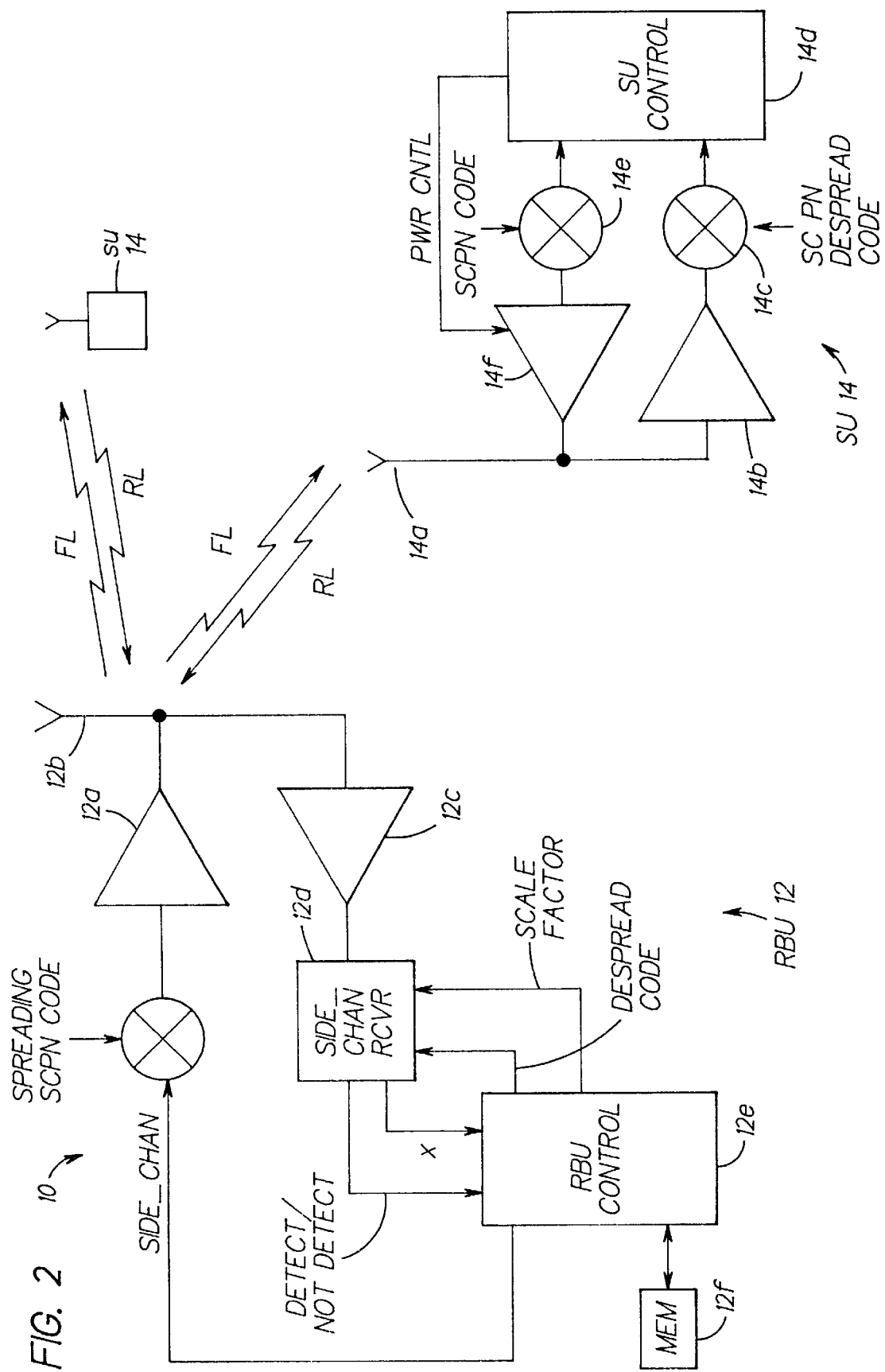
FIG. 2 is another block diagram of the communications system of FIG. 1.

FIG. 2 is a simplified block diagram also of a synchronous, DS-CDMA communications system 10 in accordance with this invention, the system having a radio base unit (RBU) 12 and a plurality of transceiver or subscriber units (SUs). The RBU transmits a side channel to the SUs, and also receives a transmitted side channel from the SUs. FIG. 2 shows other features of synchronous CDMA communications system 10, which in presently preferred embodiments of this invention is embodied as a fixed wireless loop system (FWL), is considered herein to be a CDMA system wherein forward link (FL) transmissions from a radio base unit (RBU) 12 for a plurality of transceiver units, referred to herein as user or subscriber units (SUs) 14, are bit and chip aligned in time, and wherein the SUs 14 operate to receive the FL transmissions and to synchronize the transmissions. Each SU 14 also transmits a signal on a reverse link (RL) to RBU 12 in order to synchronize the timing of its transmissions to the RBU, and to generally perform bi-directional communications. The FWL is suitable for use in implementing a telecommunications system that conveys voice and/or data between the RBU 12 and the SUs 14.

RBU 12 includes circuitry for generating a plurality of user signals (USER_1 to USER_n), which are not shown in FIG. 2, and a forward asynchronous side channel (SIDE_CHAN) signal that is continuously transmitted. Each of these signals is assigned a respective PN spreading code and is modulated therewith before being applied to a transmitter 12a having an antenna 12b. When transmitted on the FL, the transmissions are modulated in phase quadrature, and the SUs 14 are assumed to include suitable phase demodulators for deriving in-phase (I) and quadrature (Q) components therefrom. By example, each frequency channel includes up to 31 code channels, and has a center frequency in the range of 2 GHz to 3 GHz.

RBU 12 also includes a receiver 12c having an output coupled to a side channel receiver 12d. The side channel receiver 12d receives as inputs the spread signal from the receiver 12c, a scale factor signal, and a side channel despread PN code. These latter two signals are sourced from a RBU processor or controller 12e. The scale factor signal can be fixed, or can be made adaptive as a function of a number of SUs 14 that are transmitting on the reverse side channel. The side channel receiver 12d outputs a detect/not detect signal to the RBU controller 12e for indicating a detection of a transmission from one of the SUs 14, and also output a power estimate value X. A read/write memory (MEM) 12f is bidirectionally coupled to the RBU controller 12e for storing system parameters and other information, such as SU timing phase information and power estimate values.

In FIG. 2, each SU 14 includes an antenna 14a, a receiver 14b, a correlator 14c wherein the received FL transmission is despread using, for example, the side channel despreading PN code, and a SU processor or controller 14d. The SU controller 14d is responsible for managing the operation of the SU 14. These management functions include generating a variable local oscillator (LO) signal for down-converting a received FL signal, and providing the PN binary code sequences that are assigned to the SU 14 for despreading the side channel and also the user's signal. The SU 14 also includes a spreading circuit 14e for spreading a signal, such as the side channel signal, and a transmitter 14f for transmitting the DS-CDMA signal on the RL to the RBU 12.

For the presently preferred embodiments of this invention, the antenna 12b and 14a have a line-of-sight relationship, the SUs 14 are fixed in location with respect to the RBU 12, and the antennas 12b and 14a are boresighted during installation of the SU 14. However, the teachings of this invention are not limited to only this particular presently preferred arrangement.

It is preferred that initial acquisition and synchronization be accomplished in the manner described in U.S. Pat. No. 5,825,835 for "A Multi-User Acquisition Procedure for Multipoint-to-Point Synchronous CDMA Systems" by Samuel C. Kingston et al., or in U.S. Pat. No. 5,805,584 for "A Multi-User Acquisition Procedure for Point-to-Multipoint Synchronous CDMA Systems" by Samuel C. Kingston et al., each of which is hereby incorporated by reference herein.

Data scrambling according to the present invention can be utilized both in the forward point-to-multipoint direction and also in the reverse multipoint-to-point direction of the system of FIG. 1 and the system of FIG. 2. These are also respectively referred to herein as the forward channel and the reverse channel of a base station to mobile or subscriber unit type arrangement. The forward channel is in the base to subscriber unit direction, while the reverse channel is in the subscriber unit to base station direction.

In forward channel 18, a code division multiplexed waveform can be transmitted. The signals respectively transmitted to the various users are summed together so that all users essentially occupy the whole bandwidth of the channel for all of the time. These signals can overlap completely both in time and in frequency and are distinguished by the individual codes that are impressed upon them. This code division multiplexed signal is transmitted from RBU 12 to subscriber unit 14 and any other subscriber units. Subscriber unit 14 needs to lock onto the signal from RBU 12 using an acquisition procedure such as is described in U.S. Pat. No. 5,805,584 for a "Multi-user Acquisition Procedure for Point-to-Multipoint Synchronous CDMA Systems" by Samuel C. Kingston et al., which is hereby incorporated by reference herein. U.S. Pat. No. 5,805,584 describes how the user is initially synchronized, then there is a tracking phase where the user has basic time alignment but needs to continue to maintain time alignment and needs to maintain it to a very small fraction of a chip. A chip is a subportion of a spreading sequence or PN code. Synchronization to achieve approximately 1% of a chip type jitter is desirable here; in other words, tracking should be very accurate. To accomplish this, in the present invention an independent scrambling pattern is impressed on every user's data before transmitting it; this scrambling pattern can then be undone at the other end of the link. In other words, a user would produce a series of bits for transmission. There is superimposed upon those bits (ones and zeros, or the like) a pattern that would be unique for each user in the system. As long as this pattern is known at the other end of the link, this pattern can then be removed to obtain the desired data. Thus, even if all users are sending the same data, nonetheless with this scrambling it would appear at the receiver that each user is sending different data.

Each subscriber unit 14 transmits data digitally, as positive ones or negative ones, or as ones and zeros, or in some other manner. A pseudonoise code or signature sequence is impressed upon those data bits that are being transmitted from each respective subscriber unit. Each user, and thus each subscriber unit, has a distinct signature sequence which would preferably be made up also of positive ones and negative ones, or ones and zeros, or the like. The data signal is passed through a multiplier before being provided to a transmitter. That multiplier multiplies the plus one-minus one sequence of data with a very high frequency alternating plus one-minus one sequence of chips which constitutes the PN code or signature sequence. The PN code or signature sequence is made up of a series of chips, with each chip being basically a period or a time-portion of the waveform during which the signature sequence takes on a value of plus one or minus one (or the like), but does not switch. The PN code is held constant for the duration of a chip. There can be many chips per bit. For example, a single bit could be multiplied by 128 chips for each bit, so that the chip rate is 128 times the bit rate. Thus, the PN code is a much higher frequency signal that is multiplied together with the data signal to produce a signal which, once so spread, looks like the PN code only it is either the PN code or the inverse of the PN code, depending on whether the user is sending a plus one or a minus one bit during that particular bit time. The alternating plus one-minus one waveform is then upconverted with a carrier and then transmitted. One way in which this can be accomplished is QPSK modulation, in which both an in-phase signal and a quadrature signal (a signal in quadrature relationship with the in-phase signal) are being transmitted which are distinguished by having the upconversion process on the in-phase channel use a cosine at the carrier frequency and having the upconversion for the quadrature signal involve multiplying the quadrature data stream by a sine rather than a cosine at the carrier frequency. By using this QPSK modulation format, it is possible to essentially double the amount of data that is being provided through the reverse channel by sending a distinct bit on the I channel versus the Q channel. Using cosine and sine carriers for those channels respectively provides an extra dimension of orthogonality to avoid interference between the two channels.

In FIG. 3, a data signal $D_k(t)$ is multiplied with the code sequence or signature sequence $C_k(t)$ of a user k to produce a spread signal $S_k(t)$, where t represents time and each of these three signals is expressed as a function of time. An illustrative example of these three signals $D_k(t)$, $C_k(t)$ and $S_k(t)$ is shown in FIGS. 4a–4c. For this example, the data of signal $D_k(t)$ is a plus or minus one pattern which here is shown as a pattern of plus one, negative one, plus one and plus one. FIGS. 4a–4c show these signals plotted versus time. $C_k(t)$, the chip sequence or the signature sequence, is shown in FIG. 4b, in a separate plot versus time. $C_k(t)$ is a pattern which repeats as often as data signal $D_k(t)$ can change. In other words, $C_k(t)$ switches at a higher frequency and is preferably some pseudorandom pattern. For the example shown in FIGS. 4a–4c, $C_k(t)$ is a pattern for user k of plus one, negative one, plus one, plus one, plus one, negative one, negative one and plus one. PN code, spreading sequence and signature sequence are synonymous terms for $C_k(t)$. $D_k(t)$ is the data or bits that are to be transmitted. In FIG. 4, $T_b$ is a symbol time. On the time axis in FIG. 4, times of zero, $T_b$, $2T_b$, $3T_b$ and $4T_b$ are shown. In time $T_b$, there is a number of chips which are of higher frequency. Each chip occupies a time duration $T_c$, also referred to as the chip time. In the example of FIGS. 4a–4c, there are 8 chips per data bit. The processing gain PG would thus be $T_{bit}/T_{chip}$ equals $T_b/T_c$ equals 8. A single plus or minus one symbol is sent in time $T_b$, and that symbol is transmitted continuously during that time period. During the second symbol period from time $T_b$ to time $2T_b$, another symbol is sent, in this example a negative one. For simplicity, for this example, $C_k(t)$ will repeat for each symbol. For one symbol period, the pattern of $C_k(t)$ for one symbol time $T_b$ as shown in FIGS. 4a–4c is plus one, negative one, plus one, plus one, plus one, minus one, minus one and plus one for the eight chips that occur during a single bit of $D_k(t)$. As shown in FIG. 3, $D_k(t)$ and $C_k(t)$ are multiplied to produce signal $S_k(t)$. $S_k(t)$ is thus the product of $D_k(t)$ times $C_k(t)$. For the first symbol period, $D_k(t)$ equals plus one, so $S_k(t)$ is one times the $C_k(t)$ pattern, so that from time zero to time $T_b$, $S_k(t)$ is equal to the $C_k(t)$ pattern. During the second symbol period from time $T_b$ to time $2T_b$, $D_k(t)$ equals a negative one, so that $S_k(t)$ for that symbol period is the inverse of $C_k(t)$. For the third bit period of FIG. 4, from time $2T_b$ to time $3T_b$, $D_k(t)$ equals plus one, so that $S_k(t)$ will again be the positive pattern for $C_k(t)$ for the third bit period. $S_k(t)$ equals $D_k(t)$ times $C_k(t)$, and is the spread waveform of or for user k which is to be transmitted. $S_k(t)$ can be summed with several other spread signals from other users to produce an aggregate signal which would then be received.

Figure 5:
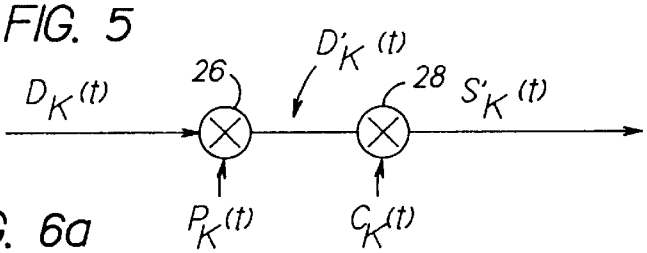
FIG. 5 is a diagrammatic representation of a data scrambling and spreading system according to the present invention.
Figure 6A:
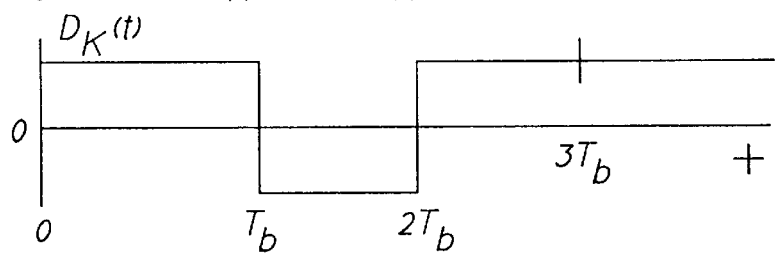
FIGS. 6a–6c are waveform timing diagrams showing illustrative timing for four consecutive illustrative bits for the system of FIG. 5 in accordance with an embodiment of the present invention.
Figure 6B:
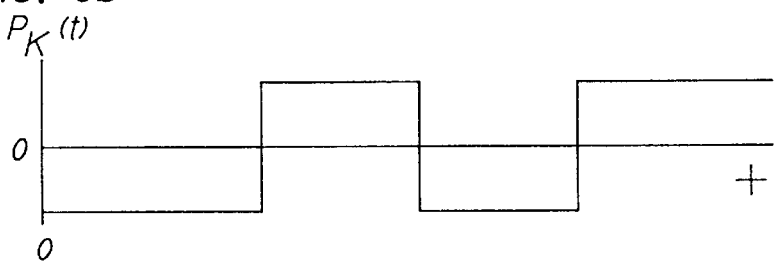
Figure 6C:
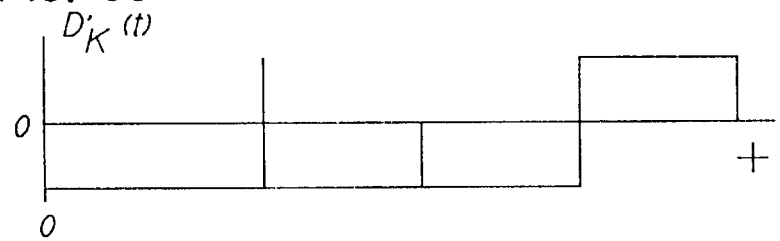
Figure 7A:
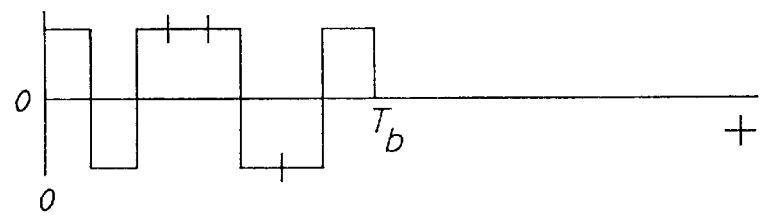
FIGS. 7a and 7b illustrate a case where a PN code (FIG. 7a) is the same as a scrambling code (FIG. 7b)

In FIG. 5, a scrambling waveform $P_k(t)$ is applied to data signal $D_k(t)$ before it is spread using code $C_k(t)$. In FIG. 5, instead of multiplying $D_k(t)$ by $C_k(t)$, $D_k(t)$ is instead premultiplied by scrambling pattern $P_k(t)$. The product of that premultiplication is then multiplied by $C_k(t)$ to produce a different spreading waveform $S'_k(t)$. Such a system is shown in FIG. 5. For this example, $D_k(t)$ in FIG. 6a and $C_k(t)$ in FIG. 7a are identical to what is shown in FIGS. 4a and 4b respectively. In FIG. 3, $D_k(t)$ and $C_k(t)$ are multiplied by multiplier 24 to produce $S_k(t)$. In FIG. 5, $D_k(t)$ and $P_k(t)$ are multiplied by multiplier 26 to produce $D'_k(t)$, which is then multiplied at multiplier 28 to produce $S'_k(t)$. For the example of FIGS. 6a and 6b, $P_k(t)$ is shown as the sequence negative one, plus one, negative one, and plus one. For the first bit period of FIGS. 6a and 6b, the product of $D_k(t)$ and $P_k(t)$ is the product of plus one and negative one, which is a negative one. In the second bit period of FIGS. 6a and 6b, the product of $D_k(t)$ and $P_k(t)$ is negative one times plus one, which is negative one. In the third bit period of FIGS. 6a and 6b, the product of $D_k(t)$ and $P_k(t)$ is plus one times negative one, which is negative one. In the fourth bit period of FIGS. 6a and 6b, the product of $D_k(t)$ and $P_k(t)$ is plus one times plus one, which is plus one. The resulting signal $D'_k(t)$ is the scrambled data pattern where the scrambling occurred prior to transmission. $P_k(t)$ is a pattern which is distinct for user k. $P_k(t)$ is multiplied by data $D_k(t)$ to produce scrambled data signal $D'_k(t)$. For the example shown in FIG. 6, $P_k(t)$ has the same frequency as $D_k(t)$. In other words, the scrambling pattern provided by $P_k(t)$ is a bit for bit scrambling rather than a multichip per bit spreading that is accomplished using $C_k(t)$. However, it is preferred that $P_k(t)$, while having a frequency similar or identical to that of $D_k(t)$, represent a code or sequence of values identical to that of $C_k(t)$, so that only one code sequence need be known and stored for each user. As shown in FIGS. 6a–6c, $D'_k(t)$ is quite different from $D_k(t)$. If there was another user j which was trying to send exactly the same data pattern as would user k but had a scrambling pattern $P_j(t)$ that was different from $P_k(t)$, user j would then transmit a different data pattern from that of user k. Thus, in the system of FIG. 5, independent data is transmitted for different users. Thus, the system of FIG. 5 protects against a very serious degradation to system 10 by providing scrambling of the data.

Figure 7B:
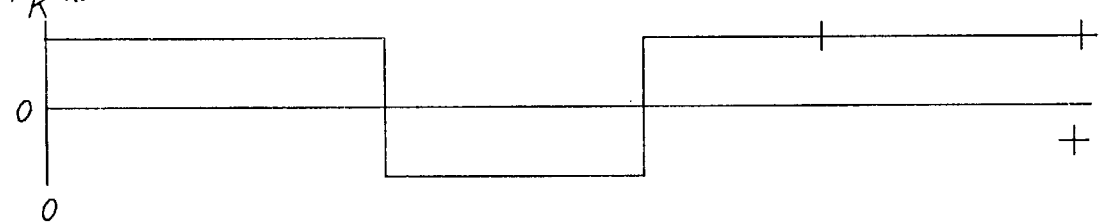

As discussed above, even though pattern $P_k(t)$ is operating at a different rate from code $C_k(t)$, it is preferred that it use the same pattern. This is illustrated in FIG. 7. In FIG. 7, $C_k(t)$ is shown identical to $C_k(t)$ of FIG. 4. However, a different scrambling pattern $P'_k(t)$ is shown where sequence or pattern is identical to that of $C_k(t)$. Thus, during the first bit time for $P'_k(t)$, $P'_k(t)$ has the same binary value as does $C_k(t)$ during the first chip. As shown in FIG. 7, $C_k(t)$ shows an initial pattern of plus one, negative one, plus one, plus one, and plus one, which is repeated in the first five bit times of $P'_k(t)$. This is done because independent $C_k(t)$ waveforms have already been assigned to independent users. Using the same patterns for scrambling of the data, as is used for spreading of the data, ensures that the scrambling patterns will also be unique. Also, PN codes for different users are selected because they have very good properties relative to each other; two distinct signature sequences tend to be nearly orthogonal relative to each other, which means that if two distinct signature sequences are multiplied together, and are then integrated over one bit, the result is very nearly zero. This is a desirable property at the bit level also. This is because scrambling patterns $P_k(t)$ and $P_j(t)$ would then be orthogonal or nearly orthogonal over any bit span, which is a desirable property. Thus, using the same signature sequence for user k as the scrambling pattern is a preferred implementation.

Although it is preferred that data D and pattern P have the same period, this is not absolutely necessary. For example, $P_k(t)$ could for example be half of the bit time of $D_k(t)$ in duration. The resulting spread waveform would still have the same bandwidth and the same basic properties. Thus, it is not necessary that $P_k(t)$ and $D_k(t)$ have the same frequency. However, it is preferred that they do, because then the process of multiplying $P_k(t)$ and $D_k(t)$ can be done with an exclusive OR gate, which for this purpose is basically like a digital multiplier.

Figure 11:
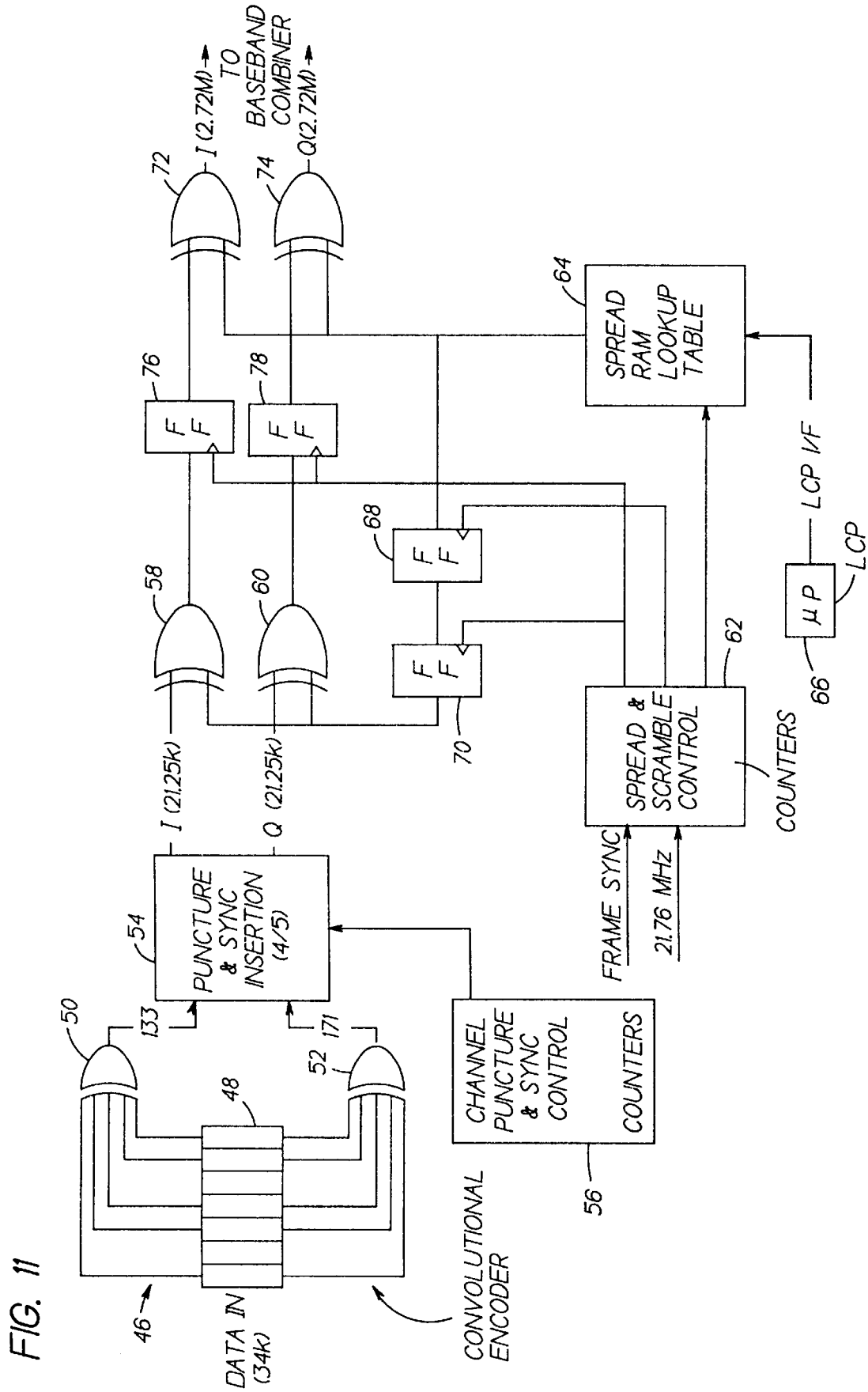
FIG. 11 is a block diagram of a system that can produce the scrambled signal of FIG. 10.

The embodiment of FIGS. 8 and 9, and the embodiment of FIGS. 10 and 11, differ with respect to how the data is actually encoded for error control before it is transmitted on the channel, and with respect to how that data is framed because of higher level protocols which are added on. In the higher level protocols, control information and synchronization bits are inserted into the data stream before the data is transmitted. The scrambling of the present invention operates differently with respect to that higher level protocol in the embodiment of FIGS. 8 and 9 versus the embodiment of FIGS. 10 and 11. For these two embodiments, it is presumed that a PCM (pulse code modulated) interface is used. A PCM interface is an industry standard interface which takes samples of voice, digitizes them into eight bits, puts them out on a serial bus stream eight bits at a time, and then groups them into thirty-two channels, eight bits at a time, using two channels for overhead. The data is transmitted at a 2.048 megaHertz rate in bursts of eight. Those eight bits are placed in a data stream at 64 kiloHertz. Added to that is 4 kiloHertz of overhead that gets embedded into the data stream. To minimize latency, those 4 kiloHertz overhead data bytes are placed in various places in the data stream to produce a continuous frame. For the scheme of FIG. 8, the data frame is broken up into four sections, and each section contains sixteen bytes (for example, the first sixteen bytes) of data from the data stream to be transmitted. At the first of each such sixteen byte burst or chunk of data, one byte of overhead data is inserted. The first such overhead byte would be a frame synchronization signal or flag. Before each successive sixteen byte data field would be placed a control byte. In each case, the control byte is in addition to the sixteen bytes of data that it precedes. With the flag bytes and control bytes embedded, a serial stream running at 68 kiloHertz results. In each sixteen byte data field, the first eight bits are scrambled with a scramble code such as $P_k(t)$, the next eight bits of data would be scrambled with the same scramble code, and so on through the whole frame. Thus, the same scramble code would be used sixteen times in every one of those sixteen byte data fields. However, scrambling of the flag byte and the control bytes is for this embodiment considered unnecessary and not preferred. The RBU and SU are assigned to use a certain scrambled byte or descrambled bytes for particular channels. As with the PN codes, the scramble patterns are preferably constructed so that they would be as far apart as possible, so that the scrambled data would not look similar or identical from one channel to another. This scrambling technique is accomplished by the system of FIG. 9. In FIG. 9, the frame synchronization signal is combined with the 68 kiloHertz clock/enables to produce the flag/control signal which is to be inserted into the data stream. As discussed above, the 64 kiloHertz data stream is framed into a 68 kiloHertz framing. Associated with that framing is a digital frame synchronization signal which goes onto the scrambler along with the 68 kiloHertz clock and the frame data. This framed data is applied to one input of exclusive OR gate 32. The other input of exclusive OR gate 32 is provided by scrambler 34. Scrambler 34 takes data from a microprocessor interface 36 (scramble byte) and puts that data into a shift register 38 on the frame boundary. The data obtained from microprocessor interface 36 is provided via register 40 to shift register 38. Microprocessor interface 36 is connected to microprocessor 42. The content of shift register 38 is shifted out from register 38 at a 68 kiloHertz rate in a circular fashion to be exclusive-ORed with the data frames. Control logic 30 performs counting so that it will know when the frame synchronization occurred and when the clock enables were occurring with the data. Control logic 30 turns off scrambler 34 for these flag bytes and control bytes where they occur in the frame. This gating is accomplished using AND gate 44. Control logic 30 uses one or more counters to determine when to turn off scrambler 34.

Convolutional encoding is a method of encoding a digital data stream for transmission over a noisy channel. Basically, the input data stream is mapped to a channel transmission symbol stream which is not necessarily at the same rate as the input data stream. For example, one bit could be put in from the input data stream to obtain three symbols out, and those three symbols would then be transmitted in the period of time that the one bit occupied. For that example, this would represent a rate 1/3 code in that case. Also, the multilevel modulation scheme called quadrature phase shift keying (QPSK) transmits two bits of information per symbol that is transmitted, so that both such produced signals are transmitted in the same bit time through the channel. Scrambling according to the present invention occurs prior to such encoding.

FIG. 10 shows an alternative data framing scheme which is an alternative to, and preferred to, that of FIG. 8. In the framing scheme of FIG. 10, scrambling is done after convolutional encoding on the entire frame, with the exception of the sync word at the beginning of each frame. In the framing scheme of FIG. 10, a rate 4/5 code is produced. A rate 1/2 code is applied to the input data stream, so that for every input bit that is produced, two bits out are produced, forming one 4-level symbol out. Next, this four-level symbol is punctured. Puncturing is a process of erasing certain bits from the output stream that are not to be transmitted. The effect of puncturing is to change the rate that symbols are transmitted over the channel. Puncturing is a technique well-known in the art. This puncturing is removed by a Viterbi decoder at the receiver. The placeholders do not bias the Viterbi decoder one way or the other, so that the Viterbi decoder treats the placeholders, left from so dropping symbols, as null symbols that do not contribute to bias the decoder one way or the other in terms of making decisions on what was transmitted. Since the rate 1/2 code is punctured, the overall rate ends up being a rate 4/5 code. In other words, if four bits are inputted to a rate 4/5 code, then five bits would be produced. However, the output bits are transmitted two bits at a time, using QPSK.

A convolutional encoder encodes a data stream to be transmitted so that stream has redundancy in it. This redundancy allows for errors in the bit stream, so that the receiver can still determine what was transmitted even with those errors because of the fact that there is redundancy. A Viterbi decoder looks at a noisy stream which has been transmitted and which has had redundancy introduced into the data stream. Even if the bits coming into a convolutional encoder are purely independent and totally unpredictable, after going through a convolutional encoder those bits are predictable and are dependent on each other and redundancy is present therein. Even if some of those bits are thereafter corrupted when they go through the channel, the Viterbi decoder looks at them in context and determines what the bit stream was that was transmitted. Basically, convolutional encoding is a process of adding redundancy in a desirable way to what would otherwise be an identically distributed series of random bits which were completely unpredictable. The Viterbi decoder undoes what the convolutional encoder does, and also undoes whatever noise was introduced, as long as there has not been too much noise. Alternatively, other forms of forward error correction besides convolutional encoding and Viterbi correction can be used.

In the framing scheme of FIG. 10, the entire frame including control bytes excluding the synchronization byte is scrambled. This scrambling is accomplished by performing scrambling after convolutional encoding (and puncturing) on the entire frame with the exception of the synchronization word at the beginning of each frame. However, puncturing need not be accomplished in the practice of the present invention, although it is desirable for some situations. This scrambling is accomplished using the system of FIG. 11 or the system of FIGS. 12 and 13. In FIG. 11, a (for this example) 34 kiloHertz rate of data is applied to convolutional encoder 46. Convolutional encoder 46 includes a register 48 receiving the input data, and two exclusive OR gates 50 and 52. The input to exclusive OR gate 50 is a series of taps (octal value 133) off register 48. The inputs to exclusive OR gate 52 is a series of taps (octal value 171) off register 48. The outputs of exclusive OR gates 50 and 52 are provided to puncture and synchronization insertion block 54. Block 54 is controlled by channel puncture and sync control counters 56. Puncture and sync insertion block 54 produces an in-phase (I) output and a quadrature phase (Q) output. Puncturing and sync insertion are well known in the art. It should be understood that puncture and sync insertion need not be accomplished for practice of the present invention. The I and Q outputs of puncture and sync insertion block 54 are provided as inputs to exclusive OR gates 58 and 60, respectively. The I output of block 54 is applied as an input to exclusive OR gate 58. The Q output of block 54 is applied as an input to exclusive OR gate 60. Spread and scramble control counters 62 are clocked by a 21.76 megahertz clock (for example) and are reset by the frame synchronization word. Counters 62 are used to look up the appropriate scrambling pattern and spreading code in table 64. Table 64 can be implemented in memory, such as in RAM. Table 64 is initially loaded by microprocessor 66 (LCP). Counters 62 also perform a divide-by function on the received clock to produce two different reduced clocks which are applied to the trigger inputs of respective data-type flipflops 68 and 70. The LCP (line control processor) microprocessor 66 determines the PN code (and scrambling pattern) to be used. Within the practice of the present invention, counters 62 and table 64 could be dispensed with, and an appropriate generator could be used upon command to generate the scrambling pattern and the spreading code. Again, a separate scrambling pattern and separate spreading code must be generated for each user, whether the forward channel or the reverse channel is being used. However, counters 62 and table 64 are preferred. The scrambling pattern produced by table 64 is provided to the data input of flipflop 68 and to respective inputs of exclusive OR gates 72 and 74. When clocked by counters 62, flipflop 68 generates an output which is provided to the data input of flipflop 70. When clocked by counters 62, flipflop 70 produces an output which is provided to respective inputs of exclusive OR gates 58 and 60. The clocking signal applied to the trigger or clock input of flipflop 70 is also applied to the trigger or clock input of flipflops 76 and 78. The output of flipflop 76, and the output of table 64, are provided to respective inputs of exclusive OR gate 72. The output of flipflop 78, and the output of table 64, are provided to respective inputs of exclusive OR gate 74. The outputs of exclusive OR gates 72 and 74 are provided as the I and Q signals to a baseband combiner (not shown). On the forward channel, the baseband combiner combines all in-phase (I) signals, and combines all quadrature (Q) signals, for the various users at the chipping rate used for the PN codes for those users.

Scrambling in the manner shown in FIG. 10 is accomplished by the system of FIG. 11. In FIG. 11, a 34 kiloHertz rate of data is provided to convolutional encoder 46, and from convolutional encoder 46 to puncture circuit 54. Puncture circuit 54 produces I and Q channels at a symbol rate of 21.25 kiloHertz, for example. The chipping rate can for example be 128 chips per symbol. Before spreading of the symbols is accomplished, the first chip of the scramble code is captured at the symbol rate, exclusive-ORed with the I and Q outputs of puncture circuit 54 at the 21.25 kiloHertz rate, and then put through to the spreading part of the system of FIG. 11 at the chipping rate of 2.72 megaHertz. While that first chip has been captured, the second chip in the scramble code is being captured by counters 62, is queued up for the next I and Q symbols produced by puncture circuit 54, is exclusive-ORed with those I and Q symbols, and is then spread with the 128 length PN code. The frame can any number of symbol pairs long, and is restarted when the frame sync pulse appears and the process begins again. The control logic at counters 62 for the scramble circuit looks for when the frame sync pulse occurs. There are ten I and Q symbol pairs that the first portion of every frame is reserved for an inserted synchronization flag that the subscriber unit is going to be looking for constantly to see where that frame synchronization occurs. Again, the frame synchronization (five symbol pairs or ten bits) are not scrambled. PN codes are stored in RAM 64. These same PN codes are used to scramble as well as to spread. When the frame sync pulse appears, it resets counters 62 which then count; this count is applied as an address to RAM 64 to pull the PN code from out of RAM. In this manner, it is determined which bit is going to be used for scrambling/spreading. Counters 62 run at the symbol rate as opposed to the chipping rate. The chipping rate is the rate at which the PN code is produced. The PN code will sequentially cycle through the addresses in RAM 64. The scrambling pattern does the same thing, except that the counter as applied to scrambling is running at a different speed. Every time that a new symbol word is produced by puncture circuit 54, the next PN code is obtained from RAM memory 64. When the frame sync pulse appears, counters 62 wait five symbol times and then begins counting from zero. Counters 62 counts up to 127. When counters 62 count up to 127, counters 62 jump back to a zero count and count back up to 127 again. If the frame size is not an equal multiple of the PN code, then the counters would keep counting, and not return to zero, until the frame sync pulse appears again. Thus, in this example, PN codes are produced by counters 62 and table 64 for 128 channels and 128 users. At the receiving end of the channel is a descrambler and despreader similar to that of FIG. 11 which is used to remove first the spreading and then the scrambling from the transmitted signal. Since the frame sync word is transmitted with the data, it is detected and used to reset counters 62 at the receiving end also.

Figure 12:
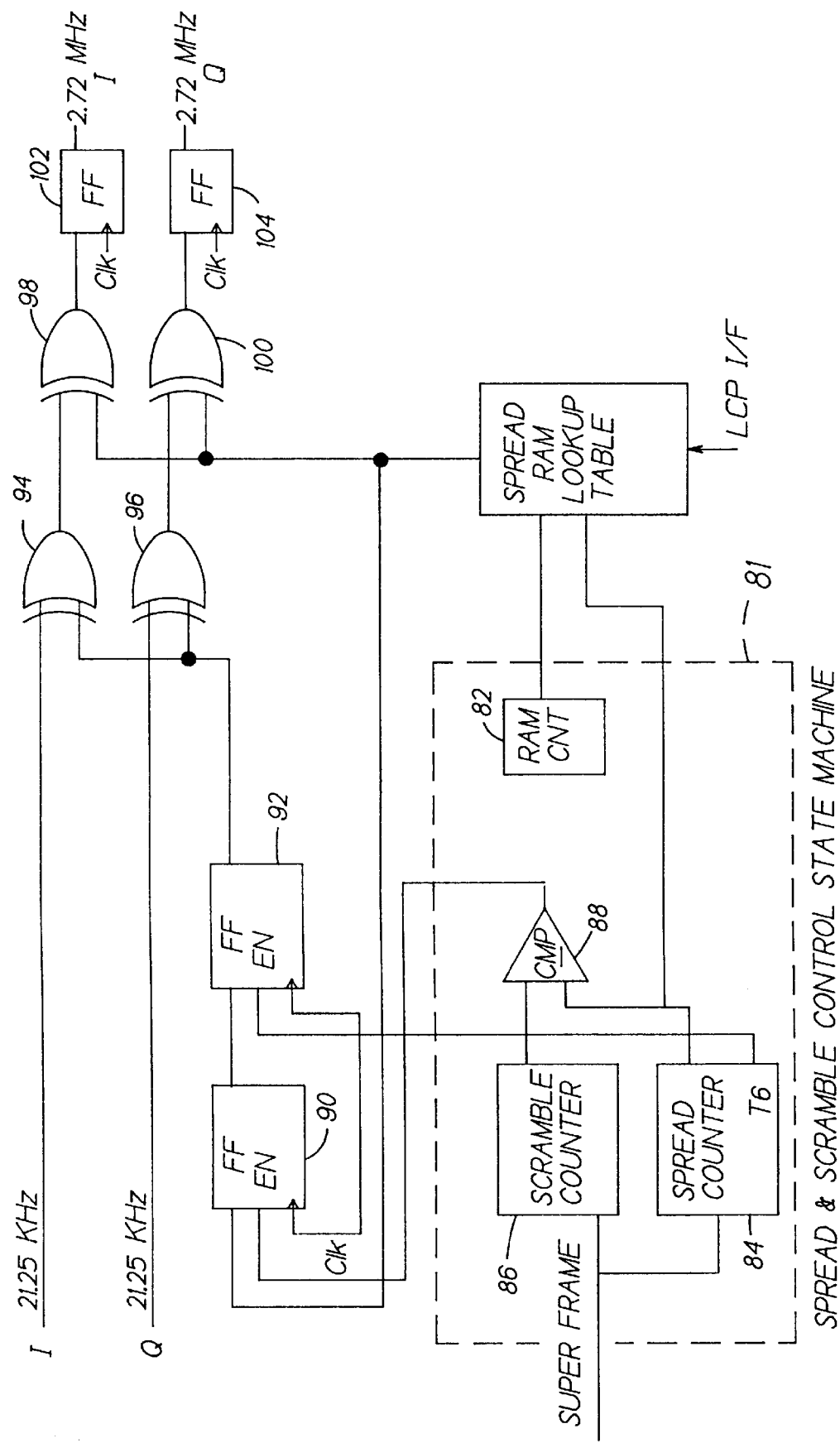
FIG. 12 is a schematic block diagram showing an alternative system that can produce the scrambled signal of FIG. 10.
Figure 13:
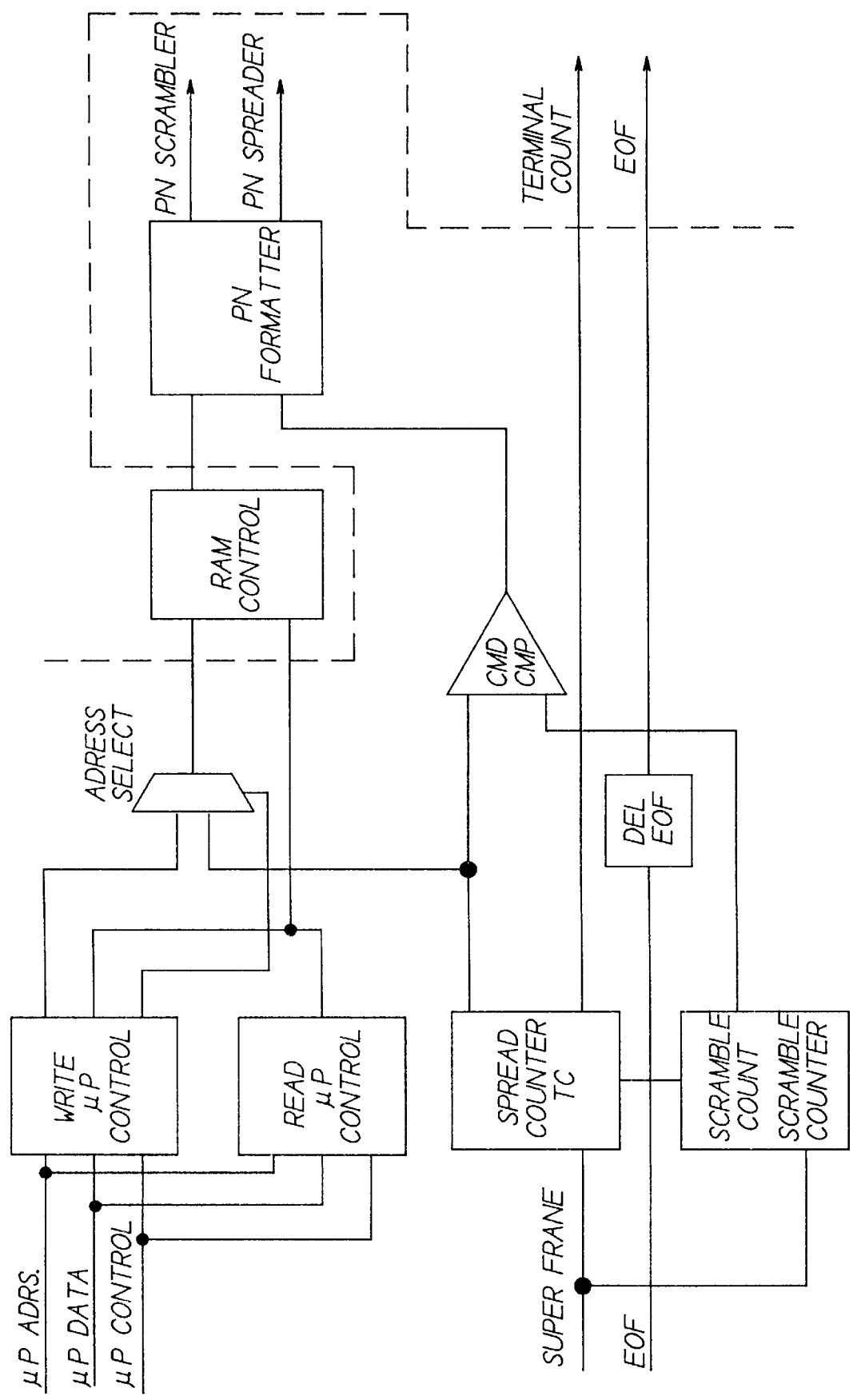
FIG. 13 is a block diagram showing a portion of the system of FIG. 12 in greater detail.

FIG. 12 is an alternative embodiment of a portion of the system of FIG. 11. The I and Q signals shown are produced by puncture circuit 54 of FIG. 11. In the scrambling and spreading circuit of FIG. 12, RAM memory 80 holds the pseudonoise codes in a lookup table. RAM control circuit 82 controls the write pulse, output enable, etc. for RAM 80. Spread counter 84 generates the address for the lookup table of RAM 80; the output of RAM 80 then produces the PN code in the correct order. Scramble counter 86 counts from zero through 127 at the symbol rate (for this example, 21.25 kilohertz). Counter 86 rolls over and is reset at the end (the super frame boundary) of the frame of FIG. 10. This rollover allows the same PN code to be used for scrambling as well as spreading, thereby saving space in memory. Counter 86 does not count during the sync word time of the frame of FIG. 10, resulting in the sync word not being scrambled, as discussed above. Regarding comparator 88, when the count of scramble counter 86 matches the count value of spread counter (or PN counter) 84, an enable is generated by comparator 88; this enable is provided to flipflop 90, so that the correct spread bit is registered in flipflop 90. Spread and scramble control state machine 81 includes RAM controller 82, counter 84, counter 86 and comparator 88. Comparator 88 compares the present count value of counter 86 with the present count value of counter 84. Flipflop or register 90 holds the intermittent scramble bit. Flipflop 92 holds the scramble bit that is then presently scrambling the data. The terminal count of spreading counter 84 enables flipflop 92 to load the scramble bits. In other words, the scramble bits are re-registered when counter 84 reaches the end of its count. In this manner, the scramble word is changed when the symbol changes. Exclusive OR gates 94 and 96 are used for scrambling. Exclusive OR gates 98 and 100 are used for spreading. Flipflops 102 and 104 register spread and scrambled data, and each run at 2.72 megaHertz. FIG. 13 shows the spread and scramble control state machines I of FIG. 12 in greater detail.

FIG. 12 and FIG. 13 can be implemented in software. An example of such software is given below in the VHDL software programming language. Block numbers in the software below refer to block numbers in FIG. 13.

```
--
################################################################
--
--##
--##    FILE NAME:      pncodre.vhd
--##    TILE TYPE:      ASCII (VHDL Code)
--##
--##    IMPLEMENTATION: SU/rbu pn code formatter Receiver RAM
--##              FWL SU/rbu
--##
--
################################################################
--

--              DESCRIPTIVE OVERVIEW
--------------------------------------------------------------------
```

23

--
-- this modules is the RAM that holds the PN code data for each channel
-- channel one has two alternate ram banks
--------------------------------------------------------------------------
--                  LIBRARY DECLARATION                    --
--------------------------------------------------------------------------
library IEEE;
use IEEE.std_logic_1164.all;
USE IEEE.std_logic_arith.all;
use IEEE.std_logic_unsigned.all;
--------------------------------------------------------------------------
--                   ENTITY DECLARATION                    --
--------------------------------------------------------------------------

ENTITY pncode12 IS
PORT(RSCP          : IN std_logic;    -- rx clk
    ChipStrb       : IN std_logic;    -- pn chip en
    RxMstrRst_N    : IN std_logic;    -- sync reset active low
    SymStb         : IN std_logic;    -- causes the PN cnt to start over
    SFrameSyncEn   : IN std_logic;
    FrameSyncEn    : IN std_logic;    -- causes the scramble data to start
    PnFrmMk_Andy   :   IN  STD_LOGIC;--delayed frame pluse
    PnSuperFrmMk_Andy : IN  STD_LOGIC;  -- if it does not show up in a
                                        -- frame time then scramble data is
                                        -- zeroed ArmCP          : IN std_logic;    -- uP clk
    ArmNRW         : IN std_logic;    -- read/write_not
    pn_cs          : IN std_logic;    -- chip select pn memory

24

```
    ArmAdr       : IN std_logic_vector(7 DOWNTO 0);
    ArmDtIn      : IN std_logic_vector(7 DOWNTO 0);
    com_r_wn     : IN std_logic;     -- uP read/write_not
    com_dsn      : IN std_logic;     -- uP data strobe
    PNC_Enable   : IN std_logic;     -- turn on the repective PN code
    Scram_Enable : IN std_logic;
    uPRWPN       : IN std_logic;     -- pn0 and pn1 are for channel 1 sfrm_o       : OUT std_logic;
    frm_o        : OUT std_logic;
    PNArmDtOut   : OUT std_logic_vector(7 DOWNTO 0);-- uP read data port
    ScrmPNCi     : OUT std_logic_vector(12 DOWNTO 1);   -- scramble Data Frame
aligned
    ScrmPNCq     : OUT std_logic_vector(12 DOWNTO 1);
    PN           : OUT std_logic_vector(12 DOWNTO 1);   -- the actual PN for the
four channel
    SymStbPNo    : OUT std_logic;
    dtackn       : OUT std_logic);   -- pipe line delayed symbol strobes END pncode12;

-------------------------------------------------------------------------
--              ARCHITECTURE DECLARATION                   --
-------------------------------------------------------------------------

ARCHITECTURE struct of pncode12 IS

COMPONENT ram16x8ss
  PORT(WCLK : IN std_logic;
       WE   : IN std_logic;
       D    : IN std_logic_vector(7 DOWNTO 0);
```

```
            25

A   : IN std_logic_vector(3 DOWNTO 0);
    O   : OUT std_logic_vector(7 DOWNTO 0));
END COMPONENT;
--------------------------------------------------------------------------
-- signals needed to generate the five rams
--------------------------------------------------------------------------
  SIGNAL WriteEnS      : std_logic_vector(11 DOWNTO 0);

TYPE RamDtT IS ARRAY(0 TO 11) OF std_logic_vector(7 DOWNTO 0);
  SIGNAL RamDataOut : RamDtT;
  SIGNAL RamDataIn  : RamDtT;

TYPE RamAddrT IS ARRAY(0 TO 11) OF std_logic_vector(3 DOWNTO 0);
  SIGNAL RamAddr : RamAddrT;

--------------------------------------------------------------------------
-- chip counter signals
--------------------------------------------------------------------------
  SIGNAL ChipCount     : std_logic_vector(6 DOWNTO 0);

SIGNAL PNser       : std_logic_vector(12 DOWNTO 1);

SIGNAL RandomCount  : std_logic_vector(8 DOWNTO 0);
  SIGNAL RandomEn     : std_logic;

SIGNAL ScrmPNC1Locali    : std_logic_vector(12 DOWNTO 1);
  SIGNAL ScrmPNC1Localq    : std_logic_vector(12 DOWNTO 1);

SIGNAL FrameSync    : std_logic;
  SIGNAL SymStbPNoi   : std_logic;
```

```
SIGNAL FsSt_r        : std_logic_vector(1 DOWNTO 0);
SIGNAL SyncTime      : std_logic;
SIGNAL ArmAddrLocal  : std_logic_vector(6 DOWNTO 0);
SIGNAL WriteEnable   : std_logic;
SIGNAL dsn           : std_logic;
SIGNAL Aaa           : std_logic_vector(7 DOWNTO 4);
SIGNAL dtackn_I      : std_logic;
SIGNAL SFrameSync,FrameSyn : std_logic;
--ag added
SIGNAL d_sfrm_o:  std_logic_vector(1 DOWNTO 0);
SIGNAL d1_sfrm_o: std_logic_vector(1 DOWNTO 0);
SIGNAL d2_sfrm_o: std_logic_vector(1 DOWNTO 0);
SIGNAL d3_sfrm_o: std_logic_vector(1 DOWNTO 0);
SIGNAL d4_sfrm_o: std_logic_vector(1 DOWNTO 0);
SIGNAL d5_sfrm_o: std_logic_vector(1 DOWNTO 0);
SIGNAL d6_sfrm_o: std_logic_vector(1 DOWNTO 0);
SIGNAL d7_sfrm_o: std_logic_vector(1 DOWNTO 0);
SIGNAL d8_sfrm_o: std_logic_vector(1 DOWNTO 0);
SIGNAL d9_sfrm_o: std_logic_vector(1 DOWNTO 0);
SIGNAL d10_sfrm_o: std_logic_vector(1 DOWNTO 0);
SIGNAL d11_sfrm_o: std_logic_vector(1 DOWNTO 0);
SIGNAL d12_sfrm_o: std_logic_vector(1 DOWNTO 0);
SIGNAL d13_sfrm_o: std_logic_vector(1 DOWNTO 0);
SIGNAL d14_sfrm_o: std_logic_vector(1 DOWNTO 0);

BEGIN
--+++++BLOCK 1 GOES UNTIL NEXT BLOCK 1 SIGNAL
  -- generate the twelve independent RAMs RAM5x16x8s : FOR i IN 0 TO 11 GENERATE
```

```
    URAM16x8s : ram16x8ss
      PORT MAP(WCLK      => ArmCP,
               WE        => WriteEnS(i),
               A         => RamAddr(i),
               D         => RamDataIn(i),
               O         => RamDataOut(i));
    END GENERATE;

--++++++BLOCK 1 END
--++++++BLOCK 3  BEGIN
-----------------------------------------------------------------------------
-- create the chip counter
-----------------------------------------------------------------------------
ChipCounterP: PROCESS(RSCP, RxMstrRst_N)
BEGIN
  IF RxMstrRst_N = '0' THEN
    ChipCount <= (OTHERS => '0');

ELSIF RSCP'event AND RSCP = '1' THEN

IF ChipStrb = '1' THEN
      --IF SymStb = '1' or FrameSyncEn = '1' THEN
      IF SymStb = '1'  THEN
         ChipCount <= (OTHERS  => '0');
      ELSE
       ChipCount  <= ChipCount + 1;
      END IF;
    ELSE
     null;
    END IF;
```

28

```
   ELSE
    null;
   END IF;

END PROCESS;

dsn    <= ArmCP;

--+++++BLOCK 3 END
--+++++BLOCK 2 BEGIN
------------------------------------------------------------------------------
-- select the process address or the chip count to the RAMS
------------------------------------------------------------------------------
ramaddrP: PROCESS(uPRWPN,ChipCount,
          ArmAdr,dsn)
BEGIN
  IF uPRWPN = '1' THEN
    RamAddr   <= (OTHERS => ArmAdr(3 DOWNTO 0));
    dtackn_I  <= dsn;
  ELSE
    RamAddr   <= (OTHERS => ChipCount(6 DOWNTO 3));
    dtackn_I  <= '1';
  END IF ;
END PROCESS;
 dtackn <= dtackn_I;
--++++BLOCK 2 END
--++++BLOCK 6 BEGIN
------------------------------------------------------------------------------
-- do the uP Read function
------------------------------------------------------------------------------
```

29

-- PNArmDtOut<= RamDataOut(conv_integer(unsigned(ArmAdr(7 DOWNTO 4))));

read_decodeP: PROCESS(Aaa,RamDataOut,dtackn_I)
BEGIN
 CASE Aaa IS
  WHEN "0000" =>
   PNArmDtOut <= RamDataOut(0);
  WHEN "0001" =>
   PNArmDtOut <= RamDataOut(1);
  WHEN "0010" =>
   PNArmDtOut <= RamDataOut(2);
  WHEN "0011" =>
   PNArmDtOut <= RamDataOut(3);
  WHEN "0100" =>
   PNArmDtOut <= RamDataOut(4);
  WHEN "0101" =>
   PNArmDtOut <= RamDataOut(5);
  WHEN "0110" =>
   PNArmDtOut <= RamDataOut(6);
  WHEN "0111" =>
   PNArmDtOut <= RamDataOut(7);
  WHEN "1000" =>
   PNArmDtOut <= RamDataOut(8);
  WHEN "1001" =>
   PNArmDtOut <= RamDataOut(9);
  WHEN "1010" =>
   PNArmDtOut <= RamDataOut(10);
  WHEN "1011" =>
   PNArmDtOut <= RamDataOut(11);
  WHEN OTHERS =>

```
            PNArmDtOut <= (OTHERS => '0');
        END CASE;
    END PROCESS;
--+++BLOCK 6 END
--+++BLOCK 2 BEGIN
-----------------------------------------------------------------------------
-- do the uP Write function
-----------------------------------------------------------------------------

-----------------------------------------------------------------------------
-- connect the arm data in to the ram input data ports
-----------------------------------------------------------------------------
connectP: PROCESS(ArmDtIn)
BEGIN
    FOR i IN 0 TO 11 LOOP
        RamDataIn(i) <= ArmDtIn;
    END LOOP;
END PROCESS;
-----------------------------------------------------------------------------
-- generate the write enable signal
-----------------------------------------------------------------------------
WriteEnable <= pn_cs AND NOT(com_r_wn) AND NOT(com_dsn);
Aaa <= ArmAdr(7 DOWNTO 4);

write_decodeP: PROCESS(Aaa,WriteEnable,uPRWPN)
BEGIN
    WriteEnS <= (OTHERS => '0');
    IF uPRWPN = '1' THEN
    CASE Aaa IS
        WHEN "0000" =>
            WriteEnS(0) <= WriteEnable;
```

31

```
    WHEN "0001" =>
       WriteEnS(1) <= WriteEnable;
    WHEN "0010" =>
       WriteEnS(2) <= WriteEnable;
    WHEN "0011" =>
       WriteEnS(3) <= WriteEnable;
    WHEN "0100" =>
       WriteEnS(4) <= WriteEnable;
    WHEN "0101" =>
       WriteEnS(5) <= WriteEnable;
    WHEN "0110" =>
       WriteEnS(6) <= WriteEnable;
    WHEN "0111" =>
       WriteEnS(7) <= WriteEnable;
    WHEN "1000" =>
       WriteEnS(8) <= WriteEnable;
    WHEN "1001" =>
       WriteEnS(9) <= WriteEnable;
    WHEN "1010" =>
       WriteEnS(10) <= WriteEnable;
    WHEN "1011" =>
       WriteEnS(11) <= WriteEnable;
    WHEN OTHERS =>
      WriteEnS <= (OTHERS => '0');
   END CASE;
   ELSE
    WriteEnS <= (OTHERS => '0');
   END IF;
  END PROCESS;
--++ BLOCK 6 END
```

32

```
--+++BLOCK 7 BEGIN
-----------------------------------------------------------------------
-- serialize the PN output
-----------------------------------------------------------------------

PNser(1) <= RamDataOut(0)(conv_integer(unsigned(ChipCount(2 DOWNTO 0))));
PNser(2) <= RamDataOut(1)(conv_integer(unsigned(ChipCount(2 DOWNTO 0))));
PNser(3) <= RamDataOut(2)(conv_integer(unsigned(ChipCount(2 DOWNTO 0))));
PNser(4) <= RamDataOut(3)(conv_integer(unsigned(ChipCount(2 DOWNTO 0))));
PNser(5) <= RamDataOut(4)(conv_integer(unsigned(ChipCount(2 DOWNTO 0))));
PNser(6) <= RamDataOut(5)(conv_integer(unsigned(ChipCount(2 DOWNTO 0))));
PNser(7) <= RamDataOut(6)(conv_integer(unsigned(ChipCount(2 DOWNTO 0))));
PNser(8) <= RamDataOut(7)(conv_integer(unsigned(ChipCount(2 DOWNTO 0))));
PNser(9) <= RamDataOut(8)(conv_integer(unsigned(ChipCount(2 DOWNTO 0))));
PNser(10) <= RamDataOut(9)(conv_integer(unsigned(ChipCount(2 DOWNTO 0))));
PNser(11) <= RamDataOut(10)(conv_integer(unsigned(ChipCount(2 DOWNTO 0))));
PNser(12) <= RamDataOut(11)(conv_integer(unsigned(ChipCount(2 DOWNTO 0))));

-----------------------------------------------------------------------
-- register and enable the final PN outputs & pipe line the SymStb to match
-----------------------------------------------------------------------
PNRegEnP: PROCESS(RSCP, RxMstrRst_N)
BEGIN
  IF RxMstrRst_N = '0' THEN
    PN <= (OTHERS =>'0');
    SymStbPNoi <= '0';
  ELSIF RSCP'event AND RSCP = '1' THEN
    IF ChipStrb = '1' THEN
      SymStbPNoi <= SymStb;
      IF PNC_Enable = '1' THEN
```

33

```
      PN <= PNser;
    ELSE
      PN <= (OTHERS => '0');
    END IF;
  ELSE
    null;
  END IF;
ELSE
  null;
END IF;
END PROCESS;

SymStbPNo <= SymStbPNoi AND ChipStrb;
--++++BLOCK 7 END
--++++BLOCK 8 BEGIN
---------------------------------------------------------------------------
-- delay frame pulse and super frame pulse
-------------------------------------------------------------
Delay: PROCESS(RSCP, RxMstrRst_N, SFrameSyncEn,FrameSyncEn)
BEGIN
  IF RxMstrRst_N = '0' THEN
    sfrm_o <= '0';
    frm_o <= '0';
    d1_sfrm_o <= "00";
    d2_sfrm_o <= "00";
    d3_sfrm_o <= "00";
    d4_sfrm_o <= "00";
    d5_sfrm_o <= "00";
    d6_sfrm_o <= "00";
    d7_sfrm_o <= "00";
```

34

```
        d8_sfrm_o <= "00";
        d9_sfrm_o <= "00";
        d10_sfrm_o <= "00";
        d11_sfrm_o <= "00";
        d12_sfrm_o <= "00";
        d13_sfrm_o <= "00";
        d14_sfrm_o <= "00";
        d_sfrm_o <= "00";
    ELSIF RSCP'event AND RSCP = '1' THEN
        d_sfrm_o(1) <= SFrameSyncEn;
        d_sfrm_o(0) <= FrameSyncEn;
        d1_sfrm_o <= d_sfrm_o;
        d2_sfrm_o <= d1_sfrm_o;
        d3_sfrm_o <= d2_sfrm_o;
        d4_sfrm_o <= d3_sfrm_o;
        d5_sfrm_o <= d4_sfrm_o;
        d6_sfrm_o <= d5_sfrm_o;
        d7_sfrm_o <= d6_sfrm_o;
        d8_sfrm_o <= d7_sfrm_o;
        d9_sfrm_o <= d8_sfrm_o;
        d10_sfrm_o <= d9_sfrm_o;
        d11_sfrm_o <= d10_sfrm_o;
        d12_sfrm_o <= d11_sfrm_o;
        d13_sfrm_o <= d12_sfrm_o;
        d14_sfrm_o <= d13_sfrm_o;
        sfrm_o <= d14_sfrm_o(1);
        frm_o <= d14_sfrm_o(0);
    END IF;
  END PROCESS;
--++BLOCK 8 END
```

35

```
--++++BLOCK 4 BEGIN
--------------------------------------------------------------------------
-- now output a random data out synced with the frame sync
--------------------------------------------------------------------------

--------------------------------------------------------------------------
-- first create a Random count for each symbol
--------------------------------------------------------------------------
RandomCntP: PROCESS(RSCP, RxMstrRst_N)
BEGIN
  IF RxMstrRst_N = '0' THEN
    RandomCount <= (OTHERS => '0');
    SFrameSync <= '0';
    FrameSyn <= '0';

ELSIF RSCP'event AND RSCP = '1' THEN

IF PnSuperFrmMk_Andy = '1' THEN--ag
      SFrameSync <= '1';
    ELSE
      null;
    END IF;

IF PnFrmMk_Andy= '1' THEN--ag delayed pulse
      RandomCount <= (OTHERS => '0');
      FrameSync <= '1';

ELSIF SymStb = '1' AND FrameSync = '1' THEN
      RandomCount <= RandomCount + 1;
      IF RandomCount > 340 THEN
```

36

```
    FrameSync <= '0';
    RandomCount <= (OTHERS => '0');
    IF SFrameSync = '1' THEN
      SFrameSync <= '0';
    ELSE
    END IF;
   ELSE
   END IF;
  ELSE
  END IF;
 ELSE
  null;
 END IF;
END PROCESS;

SyncTime <= '1' WHEN RandomCount > 334 ELSE '0';--ag
-- SyncTime <= '1' WHEN  RandomCount > 338 or RandomCount < 4 ELSE '0';
--++++BLOCK 4 END
--++++BLOCK 5 BEGIN
PROCESS(ChipCount,RandomCount)
BEGIN
-- IF ChipCount(0) = '0' AND
--    RandomCount(5 DOWNTO 0) = ChipCount(6 DOWNTO 1) THEN
 IF
     RandomCount(6 DOWNTO 0) = ChipCount THEN
   RandomEn <= '1';
 ELSE
   RandomEn <= '0';
 END IF;
END PROCESS;
```

```
--+++BLOCK 5 END
-- +++BLOCK 7 BEGIN
 DelayP: PROCESS(RSCP, RxMstrRst_N)
 BEGIN
  IF RxMstrRst_N = '0' THEN
    FsSt_r <= (OTHERS => '0');
  ELSIF RSCP'event AND RSCP = '1' THEN
    IF (SymStbPNoi AND ChipStrb) = '1' THEN
      FsSt_r <= FrameSync & SyncTime;
    ELSE
      null;
    END IF ;
  ELSE
    null;
  END IF ;
 END PROCESS;
-------------------------------------------------------------------------
-- now capture the pn when RandomEn is high
-------------------------------------------------------------------------
 ScrambleP: PROCESS(RSCP, RxMstrRst_N)
 BEGIN
  IF RxMstrRst_N = '0' THEN
    ScrmPNCi  <= (OTHERS => '0');
    ScrmPNCq  <= (OTHERS => '0');
  ELSIF RSCP'event AND RSCP = '1' THEN IF RandomEn = '1' AND ChipStrb = '1' THEN
      ScrmPNC1Locali <= PNser;
      ScrmPNC1Localq <= PNser;
    ELSE
```

38

```
    null;
  END IF ;

IF (SymStbPNoi AND ChipStrb) = '1' THEN
    CASE FsSt_r IS
      WHEN "11" => -- zero during sync time
        ScrmPNCi <= (OTHERS => '0');
        ScrmPNCq <= (OTHERS => '0');
      WHEN "10" =>        -- when want scramble data
        IF Scram_Enable = '1' THEN
          ScrmPNCi <= ScrmPNC1Locali;
          ScrmPNCq <= ScrmPNC1Localq;
        ELSE
          ScrmPNCi <= (OTHERS => '0');
          ScrmPNCq <= (OTHERS => '0');
        END IF ;
      WHEN OTHERS =>
        ScrmPNCi <= (OTHERS => '0');
        ScrmPNCq <= (OTHERS => '0');
    END case;
  ELSE
    null;
  END IF;

ELSE
  null;
END IF;
END PROCESS;

--++++BLOCK7 END
```

39

END struct;

Copyright © 1996, 1997 by Lockheed Martin Corporation. All rights reserved.

It should be understood that the specific numbers and values provided above are illustrative and not limiting, and that the present invention can be used with other numbers and values.

Thus, there have provided apparatus and method for reducing multi-user interference. This apparatus and method reduces jitter in the tracking of a desired signal among a plurality of interfering signals.

Obviously, many modifications and variations of the present invention are possible in light of the above teachings. It is therefore to be understood that the foregoing embodiments are presented by way of example only and that, within the scope of the appended claims and equivalents thereto, the invention may be practiced otherwise than as specifically described.

What is claimed is:

1. A data processor, comprising:
    means for scrambling a data stream to produce a scrambled data stream; and
    means for spreading the scrambled data stream;
    wherein said scrambling means scrambles the data stream at a symbol rate using a predetermined code to reduce multi-user interference resulting from a transmission of correlated data, and wherein said spreading means spreads the scrambled data stream at a chip rate using the same predetermined code.

2. A method for communicating information signals between at least one radio base unit and a plurality of subscriber units, wherein the at least one base unit and each of the plurality of subscriber units is comprised of a transmitter and a receiver for communicating therebetween using a synchronous code division multiple access technique, the method comprising the steps of:
    at a source of a communication, scrambling an information signal at a symbol rate with a scrambling pattern that uniquely identifies one of the plurality of subscriber units and that is predetermined to reduce multi-user interference resulting from a transmission of correlated data;
    spreading with a spreading code the scrambled information signal at a chip rate over at least a portion of an available transmission bandwidth to produce a spread communication signal;
    transmitting the spread communication signal to a channel;
    at a destination of the communication, receiving the spread communication signal from the channel; and
    despreading and descrambling the received communication signal to obtain the information signal,
    wherein
    the scrambling pattern and the spreading code both use substantially the name bit pattern.

3. A method for communicating information signals as set forth in claim 2, wherein the scrambling pattern is comprised of series of bits unique for each of the plurality of subscriber units.

4. A method for communicating information signals as set forth in claim 2, wherein the step of scrambling the information signal further comprises the steps of:
    providing the scrambling pattern comprised of a series of bits; and
    multiplying the information signal with the series of bits to produce the communication signal.

5. A method for communicating information signals as set forth in claim 2, wherein the spreading code is a pseudonoise spreading code having a substantially orthogonal relationship to other pseudonoise spreading codes.

6. A method for communicating information signals as set forth in claim 5, wherein the scrambling pattern for a given one of said subscriber units is comprised of a pattern of bits that are substantially the same as a pattern of bits of the pseudonoise spreading code, and wherein a bit frequency of the scrambling pattern is substantially the same as a bit frequency of the information signal.

7. A method for communicating information signals as set forth in claim 2, wherein the information signal comprises a frame structure for conveying transmission data, the frame structure including a frame synchronization portion which indicates a beginning of a frame, a control portion, and a plurality of transmission data bytes.

8. A method for communicating information signals as set forth in claim 7, wherein the step of scrambling scrambles only the plurality of transmission data bytes within the frame structure.

9. A method for communicating information signals as set forth in claim 7, wherein the step of scrambling scrambles only the control portion and the plurality of transmission data bytes within the frame structure.

10. A method for communicating information signals as set forth in claim 7, wherein the method further comprises the steps of:
    prior to the step of scrambling, convolutional encoding and puncturing the plurality of transmission data bytes; and
    after the step of descrambling, Viterbi decoding the plurality of transmission data bytes within the frame structure.

11. A synchronous code division multiple access communication system, comprising:
    at least one base unit having a transmitter and a receiver;
    a plurality of subscriber units, each of said plurality of subscriber units having a transmitter and a receiver;
    scrambling control circuitry for providing scrambling patterns which uniquely identify each of said plurality of subscriber units and which are predetermined to reduce multi-user interference resulting from a transmission of correlated data;
    means within at least one of said base unit and said plurality of subscriber units for scrambling an information signal at a symbol rate with one of maid scrambling patterns which identifies one of said plurality of subscriber units to produce a communication signal for communicating between said base unit and one of said plurality of subscriber units;
    means for spreading said communication signal at a chip rate with a predetermined spreading sequence that uniquely identifies one of said subscriber units; and
    means within at least one of said base unit and said plurality of subscriber units for despreading and descrambling said communication signal to obtain said information signal, wherein
    the scrambling pattern and the spreading sequence used for a same subscriber unit both use substantially the same bit pattern.

12. A communication system as set forth in claim 11, wherein said scrambling control circuitry provides said scrambling patterns that are comprised of series of bits unique for each of said plurality of subscriber units.

13. A communication system as set forth in claim 12, wherein said means for scrambling said information signal further comprises a multiplier for multiplying said information signal with said series of bits to produce said communication signal.

14. A communication system as set forth in claim 11, wherein said scrambling control circuitry is controlled by a state machine.

15. A communication system as set forth in claim 11, and further comprising:
spreading control circuitry for providing spreading sequences which uniquely identify each of said plurality of subscriber units; and
means for impressing upon said communication signal said spreading sequence which identifies an associated one of said plurality of subscriber units.

16. A communication system as set forth in claim 15, wherein a scrambling pattern for one of said plurality of subscriber units is comprised of a pattern of bits substantially the same as a bit pattern of said spreading sequence for said subscriber unit, and wherein a bit frequency of said scrambling pattern is substantially the same as a bit frequency of said information signal.

17. A communication system as set forth in claim 11, wherein said system further comprises:
a convolutional encoder for encoding said information signal; and
means for puncturing said encoded information signal, said means for puncturing having an input coupled to said convolutional encoder and an output coupled to said means for scrambling.

18. A communication system, comprising:
at least one base unit having a transmitter and a receiver;
a plurality of subscriber units, each of said plurality of subscriber units having a transmitter and a receiver;
scrambling control circuitry for providing scrambling patterns which uniquely identify each of said plurality of subscriber units;
means within at least one of said base unit and said plurality of subscriber units for scrambling an information signal with one of said scrambling patterns which identifies one of said plurality of subscriber units to produce a communication signal for communicating between said base unit and one of said plurality of subscriber units;
means for spreading said communication signal; and
means within at least one of said base unit and said plurality of subscriber units for despreading and descrambling said communication signal to obtain said information signal;
wherein said information signal comprises a frame structure for conveying transmission data, said frame structure includes a frame synchronization flag which indicates a beginning of a frame, a plurality of control bytes and a plurality of transmission data bytes, and wherein said means for scrambling said information signal further comprises:
synchronization control circuitry having a first input, a second input and an output, said first input receiving a frame synchronization signal, said second input receiving a clock signal, said synchronization control circuitry multiplexing said first and said second inputs to provide said frame synchronization flag and said plurality of control bytes at said output; and
a scrambler having a first input coupled to said scrambling control circuitry for receiving said one of said scrambling patterns, a second input coupled to said output of said synchronization control circuitry for receiving said frame synchronization flag and said plurality of control bytes, and a third input for receiving said plurality of transmission data bytes, said scrambler scrambling at least said plurality of transmission data bytes and combining said at least scrambled plurality of transmission data bytes, said first input, and said second input to provide said frame structure.

19. A communication system, comprising:
at least one base unit having a transmitter and a receiver;
a plurality of subscriber units, each of said plurality of subscriber units having a transmitter and a receiver;
scrambling control circuitry for providing scrambling patterns which uniquely identify each of said plurality of subscriber units;
means within at least one of said base unit and said plurality of subscriber units for scrambling an information signal with one of said scrambling patterns which identifies one of said plurality of subscriber units to produce a communication signal for communicating between said base unit and one of said plurality of subscriber units;
means for spreading said communication signal; and
means within at least one of said base unit and said plurality of subscriber units for despreading and descrambling said communication signal to obtain said information signal;
wherein said information signal comprises a frame structure for conveying transmission data, said frame structure includes a frame synchronization flag which indicates a beginning of a frame, a plurality of control bytes and a plurality of transmission data bytes, and wherein said means for scrambling said information signal further comprises:
synchronization control circuitry having a first input, a second input and an output, said first input receiving a frame synchronization signal, said second input receiving a clock signal, said synchronization control circuitry multiplexing said first and said second inputs to provide said frame synchronization flag and said plurality of control bytes at said output; and
a scrambler having a first input coupled to said scrambling control circuitry for receiving said one of said scrambling patterns, a second input coupled to said output of said synchronization control circuitry for receiving said frame synchronization flag and said plurality of control bytes, and a third input for receiving said plurality of transmission data bytes, said scrambler scrambling at least said plurality of transmission data bytes and said plurality of control bytes and combining said at least scrambled plurality of transmission data bytes and scrambled plurality of control bytes, said first input, and said frame synchronization flag to provide said frame structure.

20. A synchronous code division multiple access communication system, comprising:
at least one base unit having a transmitter and a receiver;
a plurality of subscriber units, each of said plurality of subscriber units having a transmitter and a receiver;
a data source providing data for transmission within at least one of said base unit and said plurality of subscriber units;
means for encoding said data source to provide in-phase and quadrature-phase channels each comprised of a bit stream having a frequency of bit occurrence;

a scrambling circuit for scrambling at a symbol rate each of said in-phase channels and said quadrature-phase channels with scrambling sequences; and a spreading circuit for spreading each of said scrambled in-phase channels and said scrambled quadrature-phase channels at a chip rate with spreading sequences;

wherein within said at least one of said base unit and said plurality of subscriber units, said transmitter transmits said spread, scrambled in-phase channels and said spread, scrambled quadrature-phase channels, wherein the scrambling patterns and the associated spreading sequences both use substantially the same bit pattern.

21. A communication system as set forth in claim 20, wherein said means for encoding further comprises:

a convolutional encoder for encoding said data to provide encoded in-phase and quadrature-phase channels; and means for puncturing said encoded in-phase and quadrature-phase channels to provide punctured, encoded in-phase and quadrature-phase channels.

22. A communication system as set forth in claim 21, wherein said system further comprises means within at least one of said base unit and said plurality of subscriber units for despreading, descrambling, depuncturing and decoding said transmitted punctured, encoded, spread, and scrambled in-phase and quadrature-phase channels to obtain said data.

23. In a synchronous code division multiple access communications system having at least one central transceiver and a plurality of subscriber unit transceivers, a method for reducing multi-user interference resulting from a simultaneous transmission of correlated data, comprising steps of:

in a subscriber unit transceiver that is transmitting data to the central transceiver, the transmitted data being spread at a chip rate with a pseudonoise (PN) spreading sequence unique to that subscriber unit, first performing steps of, encoding the data to be transmitted; and multiplying the encoded data at a symbol rate with the same PN sequence that is used to spread the transmitted data at the chip rate to produce scrambled data, thereby decorrelating the data from data being transmitted by another subscriber unit transceiver; then spreading the scrambled data with the PN sequence at the chip rate; and up-converting the spread data to a transmission frequency.

24. A method as in claim 23, wherein the data is transmitted in frames having a predetermined duration, each frame comprising a synchronizing portion, a control portion and a data portion, and wherein the step of multiplying operates to generate the scrambled data only from the data portion.

25. A method as in claim 23, wherein the data is transmitted in frames having a predetermined duration, each frame comprising a synchronizing portion, a control portion and a data portion, and wherein the step of multiplying operates to generate the scrambled data only from the control portion and the data portion.

26. A method as in claim 23, wherein the data is transmitted in frames having a predetermined duration, wherein the PN sequence has a predetermined length with a beginning and an end, and wherein at a start of each frame the step of multiplying begins multiplying at the beginning of the PN sequence.

* * * * *